US012424765B2

(12) United States Patent
Suh et al.

(10) Patent No.: US 12,424,765 B2
(45) Date of Patent: Sep. 23, 2025

(54) ELECTRONIC DEVICE WITH ANTENNA MODULES

(71) Applicant: LG ELECTRONICS INC., Seoul (KR)

(72) Inventors: Yusuhk Suh, Seoul (KR); Dongik Lee, Seoul (KR); Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/633,090

(22) Filed: Apr. 11, 2024

(65) Prior Publication Data

US 2024/0421496 A1 Dec. 19, 2024

(30) Foreign Application Priority Data

Jun. 16, 2023 (KR) ........................ 10-2023-0077405

(51) Int. Cl.
*H01Q 21/28* (2006.01)
*H01Q 21/06* (2006.01)

(52) U.S. Cl.
CPC ......... *H01Q 21/062* (2013.01); *H01Q 21/065* (2013.01); *H01Q 21/28* (2013.01)

(58) Field of Classification Search
CPC ..... H01Q 21/062; H01Q 21/065; H01Q 21/28
See application file for complete search history.

(56) References Cited

FOREIGN PATENT DOCUMENTS

| | | |
|---|---|---|
| KR | 1020220060498 | 5/2022 |
| KR | 1020220142206 | 10/2022 |
| WO | 2023277202 | 1/2023 |

OTHER PUBLICATIONS

Korean Intellectual Property Office Application No. 10-2023-0077405, Office Action dated Jul. 12, 2024, 5 pages.

*Primary Examiner* — Graham P Smith
(74) *Attorney, Agent, or Firm* — LEE, HONG, DEGERMAN, KANG & WAIMEY

(57) ABSTRACT

An electronic device may include a display; and first and second antenna structures disposed around the display. The first antenna structure may include a first PCB, first and second array antennas, and a first wireless communication circuit. The second antenna structure may include a second PCB, third and fourth array antennas, and a second wireless communication circuit. The second and fourth array antennas may form a beam pattern in a first direction, which is a bottom direction. The first and third array antennas may form a beam pattern in a third direction, which is a front direction.

5 Claims, 20 Drawing Sheets

(a)

(b)

(a)

(b)

ELECTRONIC DEVICE WITH ANTENNA MODULES

CROSS-REFERENCE TO RELATED APPLICATION

Pursuant to 35 U.S.C. § 119(a), this application claims the benefit of earlier filing date and right of priority to Korean Patent Application No. 10-2023-0077405, filed on Jun. 16, 2023, the contents of which are hereby incorporated by reference herein in its entirety.

BACKGROUND

1. Technical Field

The present disclosure relates to an electronic device, and more particularly, to an electronic device with antenna modules that wirelessly receive data.

2. Description of the Related Art

As image technology changes from analog to digital, development has been made from SD (Standard-Definition) to HD (Hi-Definition) to provide an image closer to a real world. SD supports a resolution of 704×480 and consists of about 350,000 pixels, and HD is divided into HD and Full HD. Between them, Full HD supports a resolution of 1920×1080 and consists of 2 million pixels to provide a significantly higher quality image compared to SD.

Recent image technology is growing one step further to Ultra High-Definition (UHD) beyond Full HD, and the UHD, which supports high image quality and ultra-high resolution, is spotlighted as a next-generation media environment. The UHD supports 4K (3840×2160) and 8K (7680×4320) resolutions and surround audio of up to 22.2 channels. Compared to the HD, the UHD provides 4 times higher picture quality than the 4K UHD, and the 8K UHD provides 16 times higher image quality than the HD.

In recent years, a wireless display system that wirelessly transmits such a high-resolution image to a display device has emerged.

The wireless display system is a system that transmits and receives A/V data between an A/V transmitting device and an A/V receiving device through a local area network.

The A/V receiving device displays A/V data received from the A/V transmitting device.

An example of the A/V transmitting device may be a transmission box having an antenna module that wirelessly transmits A/V data.

An example of the A/V receiving device may be a display device provided with an antenna module that receives A/V data transmitted from the A/V transmitting device to output the received A/V data.

The display device may include a pair of antenna modules and an IR module located between the pair of antenna modules, and the pair of antenna modules may be disposed to spaced apart from each other on left and right sides thereof.

In the wireless display system, an antenna module of the A/V transmitting device may be located on the left or right side of the display device, and in this case, a pair of antenna modules provided in the display device may receive data transmitted from the antenna module of the A/V transmitting device in a two-stream method, and the display device may output an image.

When the A/V transmitting device is disposed on the left or right side of the display device, one of the pair of antenna modules of the display device cannot receive data because its signal is blocked by the IR module, and the display device operates with one stream.

When operating with one stream, its compression rate must be doubled compared to the case with two streams to transmit and receive data at the same level as in the case of two streams, but when the compression rate is increased, its image quality level may be decreased.

SUMMARY

An aspect of the present disclosure is to provide an electronic device capable of performing wireless communication of A/V data regardless of the location of an A/V transmitting device.

Another aspect of the present disclosure is to perform A/V wireless communication in an optimized manner according to an array antenna disposition structure of an A/V transmitting device and an electronic device.

Still another aspect of the present disclosure is to perform A/V wireless communication in an optimized manner in consideration of the location of an A/V transmitting device and an electronic device, and the polarization characteristics of an array antenna.

Yet still another aspect of the present disclosure is to provide seamless A/V wireless communication even when an obstacle is disposed on a wireless communication path between an A/V transmitting device and an electronic device.

An electronic device according to the present disclosure may include a display; and first and second antenna structures disposed around the display. The first antenna structure may include a first PCB constituting a multi-layer structure, and the second antenna structure includes a second PCB constituting a multi-layer structure. The first and second PCBs may constitute a plurality of side surfaces. A first array antenna, a first wireless communication IC, and a second array antenna may be disposed on a first surface, a second surface, and a fifth surface of the plurality of side surfaces of the first PCB, respectively. A fifth array antenna, a second wireless communication IC, and a sixth array antenna may be disposed on a first surface, a second surface, and a fifth surface of the plurality of side surfaces of the second PCB, respectively.

According to an embodiment, it may be configured such that a first surface of the plurality of side surfaces faces a front direction of the electronic device, a second surface of the plurality of side surfaces faces a rear direction of the electronic device, a third surface of the plurality of side surfaces faces a left direction of the electronic device, a fourth surface of the plurality of side surfaces faces a right direction of the electronic device, and a fifth surface of the plurality of side surfaces faces a bottom direction of the electronic device.

According to an embodiment, the polarization of the first array antenna may be the same as that of the third array antenna. The polarization of the second array antenna may be different from that of the fourth array antenna.

According to an embodiment, the polarization of the first array antenna may be the same as that of the second array antenna, and the polarization of the third array antenna may be the same as that of the fourth array antenna.

According to an embodiment, the first array antenna may be polarized in a Y-axis direction to radiate a polarized signal traveling in an X-axis direction, and the second array antenna may be polarized in the Y-axis direction to radiate a polarized signal traveling in a Z-axis direction at a bottom thereof. The fifth array antenna may be polarized in the Y-axis direction to radiate a polarized signal traveling in the X-axis direction, and the sixth array antenna may be polarized in the X-axis direction to radiate a polarized signal traveling in the Z-axis direction at a bottom thereof.

According to an embodiment, the first antenna structure may further include third and fourth array antennas, which are monopole antennas in a 1×3 array, on left and right sides of the first array antenna, respectively. The second antenna structure may further include seventh and eighth array antennas, which are monopole antennas in a 1×3 array, on left and right sides of the fifth array antenna, respectively. The third and fourth array antennas may radiate horizontally polarized signals, and the seventh and eighth array antennas may radiate horizontally polarized signals.

An electronic device according to the present embodiment may perform wireless communication of A/V data regardless of the location of an A/V transmitting device through first and second antenna structures in which a plurality of array antennas are disposed.

Furthermore, the A/V transmitting device may transmit two streams of data, thereby minimizing video quality deterioration that occurs when increasing a data compression rate.

In addition, since a horizontally polarized antenna and a vertically polarized antenna can be disposed together on one substrate, thereby allowing an antenna module to be compact and providing a high data reception rate.

Moreover, horizontally and vertically polarized signals may be used according to an array antenna disposition structure of the A/V transmitting device and the electronic device, thereby performing A/V wireless communication with reduced mutual interference while increasing a communication capacity.

Besides, horizontally and vertically polarized signals may be used in consideration of the location of the A/V transmitting device and electronic device the polarization characteristics of the array antennas, thereby performing A/V wireless communication with reduced mutual interference while increasing a communication capacity.

In addition, even when an obstacle is disposed on a wireless communication path between the A/V transmitting device and the electronic device, a beamforming direction may be changed and reflected waves may be used, thereby providing seamless A/V wireless communication.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

DETAILED DESCRIPTION OF THE EMBODIMENTS

A description will now be given in detail of specific embodiments of the present disclosure, together with drawings.

Hereinafter, a description will be given in more detail of embodiments related to the present disclosure, with reference to the accompanying drawings. In general, a suffix such as "module" and "unit" may be used to refer to elements or components. Use of such a suffix herein is merely intended to facilitate description of the specification, and the suffix itself is not intended to give any special meaning or function.

A video/audio (hereinafter referred to as A/V) transmitting device according to an embodiment of the present disclosure, which is, for example, an intelligent device in which a computer support function is added to a broadcast receiving function, may have an easier-to-use interface such as a handwriting input device, a touchscreen, or a spatial remote controller as an Internet function is added thereto while thoroughly performing the broadcast receiving function.

Furthermore, the A/V transmitting device may be connected to the Internet and a computer with the support of a wired or wireless Internet function to perform functions such as e-mailing, web browsing, banking, or gaming. A standard general-purpose OS may be used to perform these various functions.

Accordingly, various applications may be freely added to or deleted from a general-purpose OS kernel, for example, thereby allowing the A/V transmitting device described therein to perform various user-friendly functions.

Figure 1:
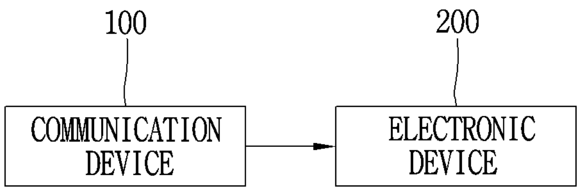
FIG. 1 is a diagram explaining a configuration of a wireless display system according to the present embodiment.

FIG. 1 is a diagram explaining a configuration of a wireless display system according to the present embodiment.

Referring to FIG. 1, a wireless display system 1 according to the present embodiment includes a communication device 100 and an electronic device 200.

The wireless display system 1 may be a system in which the communication device 100 wirelessly transmits A/V data to the electronic device 200 and the electronic device 200 outputs the A/V data.

The communication device 100 may be a device capable of encoding video and audio and wirelessly transmitting the encoded video and audio content.

An example of the communication device 100 may be an all-in-one (AIO) box capable of transmitting data, and may be, for example, a set-top box.

Another example of the communication device 100 may be connected to an external device such as a set-top box or a USB memory. The communication device 100 may transmit a video signal or an audio signal received from an external device connected thereto to the electronic device 200.

The electronic device 200 may be a display device capable of wirelessly receiving the encoded video and audio, and decoding the received video and audio.

The communication device 100 and the electronic device 200 may constitute a video wall display system.

In a video wall, a display having a thin bezel plays an important role in the visualization of video content. In order to efficiently implement a thin bezel, it is efficient to provide only components that can play a minimal role in the display, and to perform circuits or components for major functions in a separate device.

The communication device 100 may determine a type of video content and determine a compression rate of the video content based on the determined type. The compression rate of the video content may be defined as a ratio between a size of video data before encoding and a size of video data after encoding.

The type of video content may include a still image type, a general video type, and a game video type.

The communication device 100 may compress the video content according to the determined compression rate, and wirelessly transmit the compressed video content to the electronic device 200.

The electronic device 200, which may be, for example, a display device, may restore the compressed video content received from the communication device 100, and display the restored video content on a display.

Figure 2:
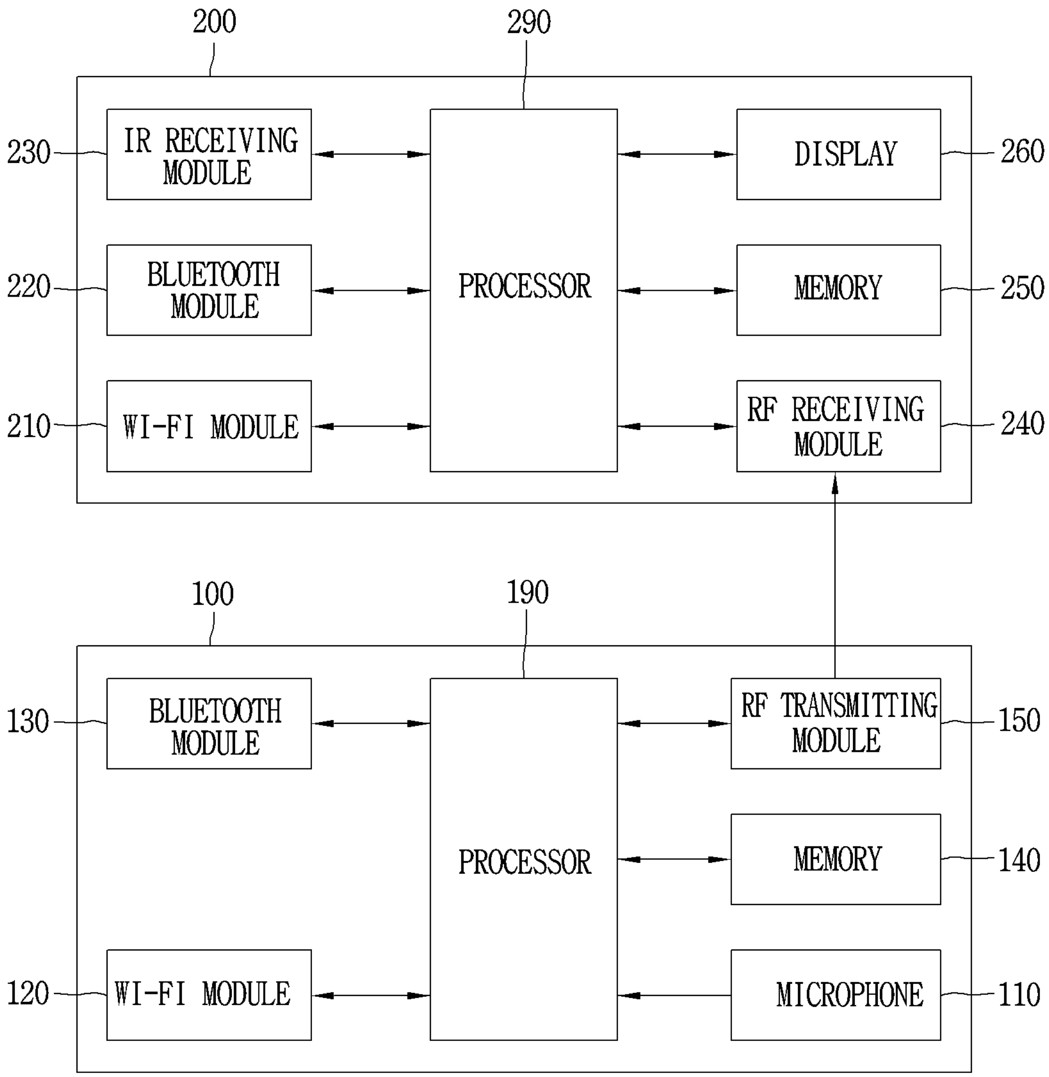
FIG. 2 is a block diagram explaining a detailed configurations of a communication device 100 and an electronic device 200.

FIG. 2 is a block diagram explaining a detailed configurations of a communication device 100 and an electronic device 200.

Referring to FIG. 2, the communication device 100 may include a microphone 110, a Wi-Fi module 120, a Bluetooth module 130, a memory 140, an RF transmitting module 150, and a processor 190.

The microphone 110 may receive an audio signal and transfer the audio signal to the processor 190.

The microphone 110 may receive a voice uttered by a user.

The Wi-Fi module 120 may perform wireless communication through the Wi-Fi standard.

The Wi-Fi module 120 may perform wireless communication with an external device or the electronic device 200 through the Wi-Fi standard.

The Bluetooth module 130 may perform wireless communication through the Bluetooth Low Energy (BLE) standard.

The Bluetooth module 130 may perform wireless communication with an external device such as a remote controller or the electronic device 200 through the Bluetooth Low Energy (BLE) standard.

The memory 140 may store a program for signal processing and control, and may store signal-processed video, audio, or data signals.

The memory 140 may perform a function for temporarily storing video, audio, or data signals received from the outside, and may store information on a predetermined image through a channel storage function.

The RF transmitting module 150 may transmit an A/V signal to the RF receiving module 240 of the electronic device 200 through Radio Frequency (RF) communication.

The RF transmitting module 150 may transmit an A/V signal compressed in a digital form to the RF receiving module 240.

The RF transmitting module 150 may transmit the A/V signal to the RF receiving module 240 through one or more channels.

The processor 190 may control an overall operation of the communication device 100.

The processor 190 may be configured in the form of a system-on-chip (SoC).

The processors 190 may be provided in plurality.

The processor 190 may compress a video signal or an audio signal received from the outside, and transfer the compressed signal to the RF transmitting module 150.

The processor 190 may include an encoder for compressing a video signal or an audio signal.

The processor 190 may be referred to as a main SoC.

The processor 190 may have one or more interfaces for connection with external devices. For example, the processor 190 may have one or more HDMI ports, and one or more USB ports.

The processor 190 may include a tuner that receives broadcast signals.

The electronic device 200 may include a Wi-Fi module 210, a Bluetooth module 220, an IR module 230, an RF receiving module 240, a memory 250, a display panel 260, and a processor 290.

The Wi-Fi module 210 may perform wireless communication through the Wi-Fi standard.

The Wi-Fi module 120 may perform wireless communication with an external device or the communication device 100 through the Wi-Fi standard.

The Bluetooth module 220 may perform wireless communication through the Bluetooth Low Energy (BLE) standard.

The Bluetooth module 220 may perform wireless communication with an external device such as a remote controller or the A/V transmitting device 200 through the Bluetooth Low Energy (BLE) standard.

The IR module 230 may receive a signal from a remote controller (not shown) through infrared (IR) communication.

The RF receiving module 240 may receive an A/V signal from the RF transmitting module 150.

The RF receiving module 240 may include a plurality of antennas. The RF receiving module 240 may be disposed below the display panel 260.

An example of the RF receiving module 240 may include a first antenna module and a second antenna module. Each of the first antenna module and the second antenna module may include a plurality of antennas.

Another example of the RF receiving module 240 may include one antenna module, and the antenna module may include a plurality of antennas.

The RF receiving module 240 may receive an A/V signal compressed in a digital form from the RF transmitting module 150, and transfer the received A/V signal to the processor 290.

The memory 250 may store a program for signal processing and control, and may store signal-processed video, audio, or data signals.

The display panel 260 may be a display panel 260 capable of displaying a video signal received from the processor 290. An example of the display panel 260 may be an LED panel.

The display panel 260 may display a video signal according to the driving of a timing controller (not shown).

The processor 290 may control an overall operation of the electronic device 200.

The processor 290 may restore the compressed A/V signal received by the RF receiving module 240. To this end, the processor 290 may include a decoder.

Hereinafter, the electronic device 200, which may be a display device, will be described with the same reference numerals as those of the A/V receiving device.

Figure 3:
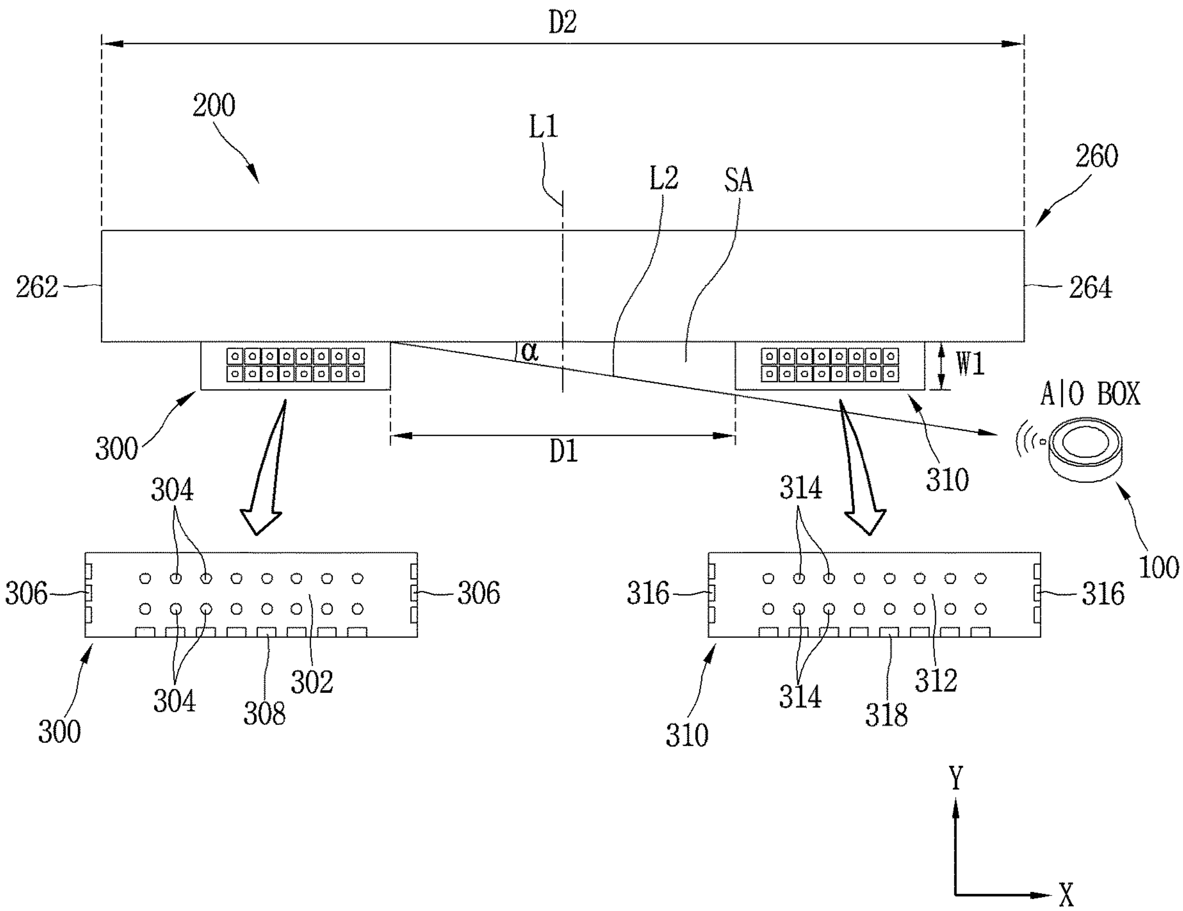
FIG. 3 is a perspective view illustrating an electronic device according to the present embodiment.

FIG. 3 is a perspective view illustrating an electronic device according to the present embodiment.

The electronic device 200 may include a display panel 260, a first antenna module 300, and a second antenna module 310.

Each of the first antenna module 300 and the second antenna module 310 may include 32 antennas, but this is merely an example. Monopole antennas 306, 308 may be disposed on both side surfaces of the first antenna module 300 and the second antenna module 310. A monopole antenna 316 may be disposed at a bottom portion of the first antenna module 300. A second monopole antenna 318 may be disposed at a bottom portion of the second antenna module 310.

The first antenna module 300 and the second antenna module 310 may be disposed below the display panel 260.

In the first antenna module 300, a plurality of first antenna patches 304, a plurality of monopole antennas 306, and a plurality of dipole antennas 308 may be disposed on a first substrate 302.

The first substrate 302 may be vertically disposed. A length of the first substrate 302 in a left-right direction X may be larger than that in a top-down direction Y. A front surface of the first substrate 302 may face forward, similar to a front surface of the display panel 260.

As illustrated in FIG. 3, the plurality of first antenna patches 304 may be arranged in a row in a horizontal direction, and may be arranged in a plurality of rows in a top-down direction Y.

The plurality of first antenna patches 304 may be arranged on a front surface of the first substrate 302.

The plurality of monopole antennas 306 may include a plurality of left monopole antennas disposed at a left side end of the first substrate 302 and a plurality of right monopole antennas disposed at a right side end of the first substrate 302. The plurality of dipole antennas 308 may include a plurality of lower dipole antennas disposed at a lower end of the first substrate 302.

The first antenna module 300 may be closer to one side end 262 between the one side end 262 and the other side end 264 of the display panel 260. The first antenna module 300 may be a right antenna module closer to a right side end between a left side end and the right side end of the display panel 260. The first antenna module 300 may be disposed to be biased toward the right of the display device 20.

Figure 4:
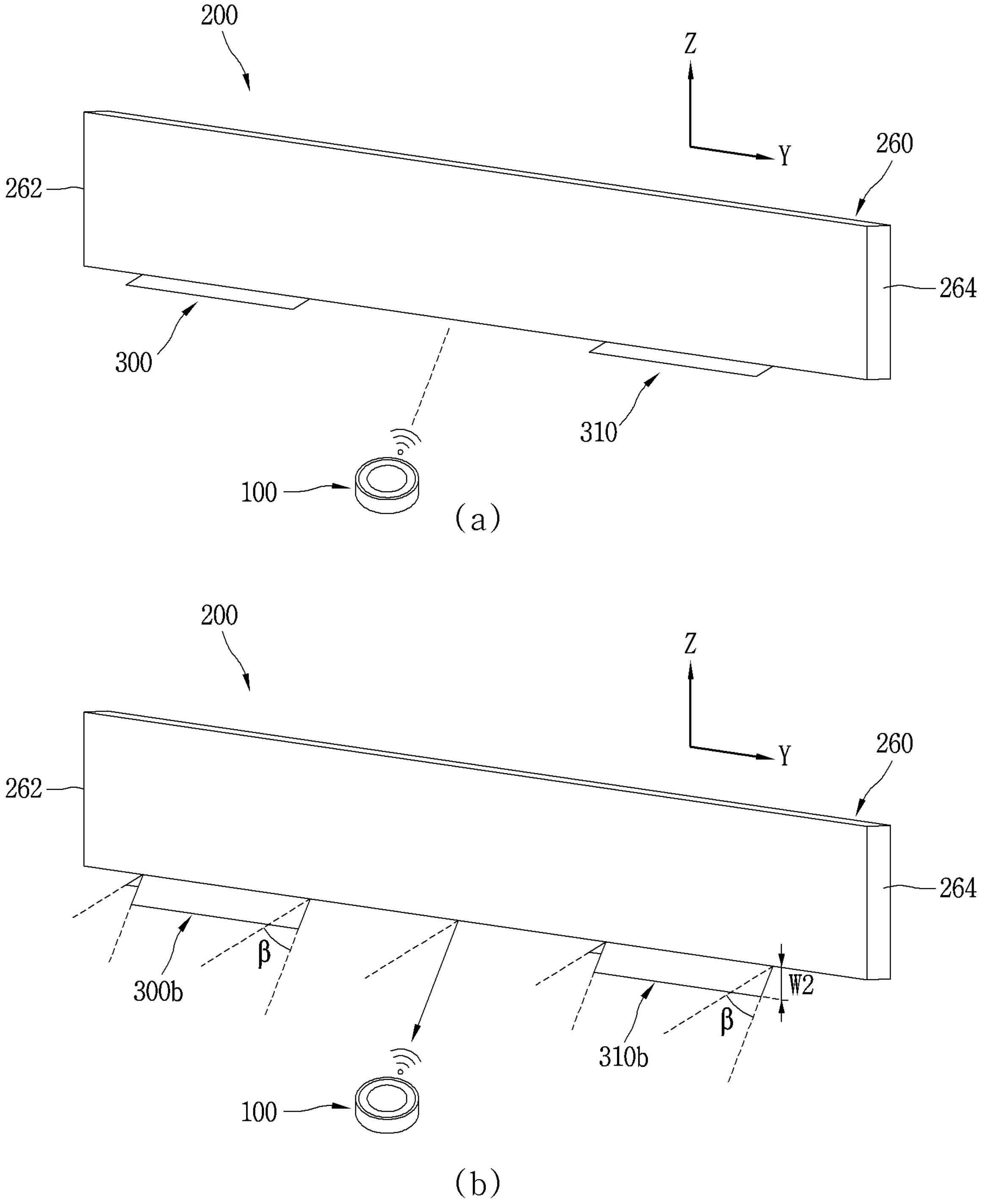
FIG. 4 is a modified example of an antenna module disposed to be inclined in an electronic device according to embodiments.

The first antenna module 300 may further include a first cover 201 in FIG. 4, which covers the first substrate 302, the plurality of first antenna patches 304, the plurality of monopole antennas 306, and the plurality of dipole antennas 308. The first substrate 302, the plurality of first antenna patches 304, and the plurality of monopole antennas 306 may be located inside the first cover 201, and may be protected by the first cover 201.

At least one antenna included in the second antenna module 310 may have a vertically polarized characteristic in which an electric field is formed in a Y-axis direction, which is a top-down direction Y corresponding to a width of the second substrate 312. In the second antenna module 310, a plurality of first antenna patches 314, a plurality of monopole antennas 316, and a plurality of dipole antennas 318 may be disposed on the second substrate 312. The plurality of second monopole antennas 318 may have vertical polarization characteristics in which an electric field is formed in the Y-axis direction, which is the top-down direction Y.

The second substrate 312 may be vertically disposed. A length of the second substrate 312 in a left-right direction X may be larger than that in a top-down direction Y. A front surface of the second substrate 312 may face forward, similar to a front surface of the display panel 260.

As illustrated in FIG. 3, the plurality of second antenna patches 314 may be arranged in a row in a horizontal direction, and may be arranged in a plurality of rows in a top-down direction Y.

The plurality of second antenna patches 314 may be arranged on a front surface of the second substrate 312.

The monopole antenna 316 is an antenna having a vertical straight or spiral conductor that operates as a half of a dipole antenna.

A plurality of monopole antennas 316 may be provided on the second substrate 312.

The plurality of monopole antennas 316 may be disposed closer to an edge between the center and the edge of the second substrate 312.

The plurality of monopole antennas 316 may include a plurality of left dipole antennas disposed at a left side end of the second substrate 312 and a plurality of right monopole antennas disposed at a right side end of the second substrate 312. The plurality of monopole antennas 318 may include a plurality of lower monopole antennas disposed at a lower end of the second substrate 312.

The second antenna module 310 may be closer to the other side end 264 between the one side end 262 and the other side end 264 of the display panel 260. The second antenna module 310 may be a left antenna module closer to a left side end between the left side end and the right side end of the display panel 260. The second antenna module 310 may be disposed to be biased toward the left of the display device 20.

The second antenna module 310 may further include a second cover 202 in FIG. 4, which covers the second substrate 312, the plurality of second antenna patches 314, the plurality of monopole antennas 316, and the plurality of monopole antennas 318. The second substrate 312, the plurality of second antenna patches 314, and the plurality of monopole antennas 316 may be located inside the second cover 202, and may be protected by the second cover 202.

As illustrated in FIG. 3, a space may be formed between the first antenna module 300 and the second antenna module 310. The IR module 230 (see FIG. 2) may be disposed in a space between the first antenna module 300 and the second antenna module 310. An extension line L1 of a center line dividing the display panel 260 into left and right sides may pass between the first antenna module 300 and the second antenna module 310.

The first antenna module 300 and the second antenna module 310 may be spaced apart from each other by a set distance D1 in a left-right direction Y.

The first antenna module 300 and the second antenna module 310 may be vertically disposed below the display panel 260. A vertical width W1 of each of the first antenna module 300 and the second antenna module 310 may be 1 cm to 2 cm, for example, 1.5 cm.

As illustrated in FIG. 3, the communication device 100 may be located outside the electronic device 200, and a shaded area (SA) in which data transmitted from the communication device 100 is not received may be formed between the first antenna module 300 and the second antenna module 310.

Meanwhile, an antenna module disposed in an electronic device according to the present disclosure will be described. FIG. 4 is a modified example of an antenna module disposed to be inclined in an electronic device according to embodiments.

Referring to (a) of FIG. 4, the first antenna module 300 and the second antenna module 310 may be horizontally disposed below the display panel 260. When the first antenna module 300 and the second antenna module 310 are horizontally disposed, the first antenna module 300 and the second antenna module 310 may face forward. The first antenna module 300 and the second antenna module 310 may be disposed in a vertical structure or a horizontal structure.

Referring to (b) of FIG. 4, the first antenna module **300*b* and the second antenna module 310*b* may be disposed below the display panel 260 to be inclined at a predetermined angle (β). The first antenna module 300*b* and the second antenna module 310 may be disposed to be inclined in an inclination direction at a front lower side. Lower ends of the first antenna module 300*b* and the second antenna module 310*b* may face a front lower side of the display panel 260. The first antenna module 300*b* and the second antenna module 310*b* may be disposed at a front lower side in the vertical structure as shown in (a) of FIG. 4 or disposed at a front lower side in the horizontal structure as shown in (b) FIG. 4**.

When the first antenna module **300*b* and the second antenna module 310*b* are disposed below the display panel 260 to be inclined at a predetermined angle (β), a vertical width W2 of the first antenna module 300*b* and the second antenna module 310*b* may be 0.5 cm to 1.5 cm. For example, the vertical width W2 of the first antenna module 300*b* and the second antenna module 310*b*** may be 1 cm.

Configurations other than the disposition directions of the first antenna module 300 and the second antenna module **310*b* are the same as or similar to those of a first example of the display device illustrated in FIG. 3**, and a detailed description thereof will be omitted.

Meanwhile, the electronic device 200 may receive an A/V signal from the communication device 100 through an A/V signal transmission/reception beam. To this end, at least one A/V signal transmission/reception beam may be formed between the communication device 100 and the A/V receiving device 200.

Figure 5:
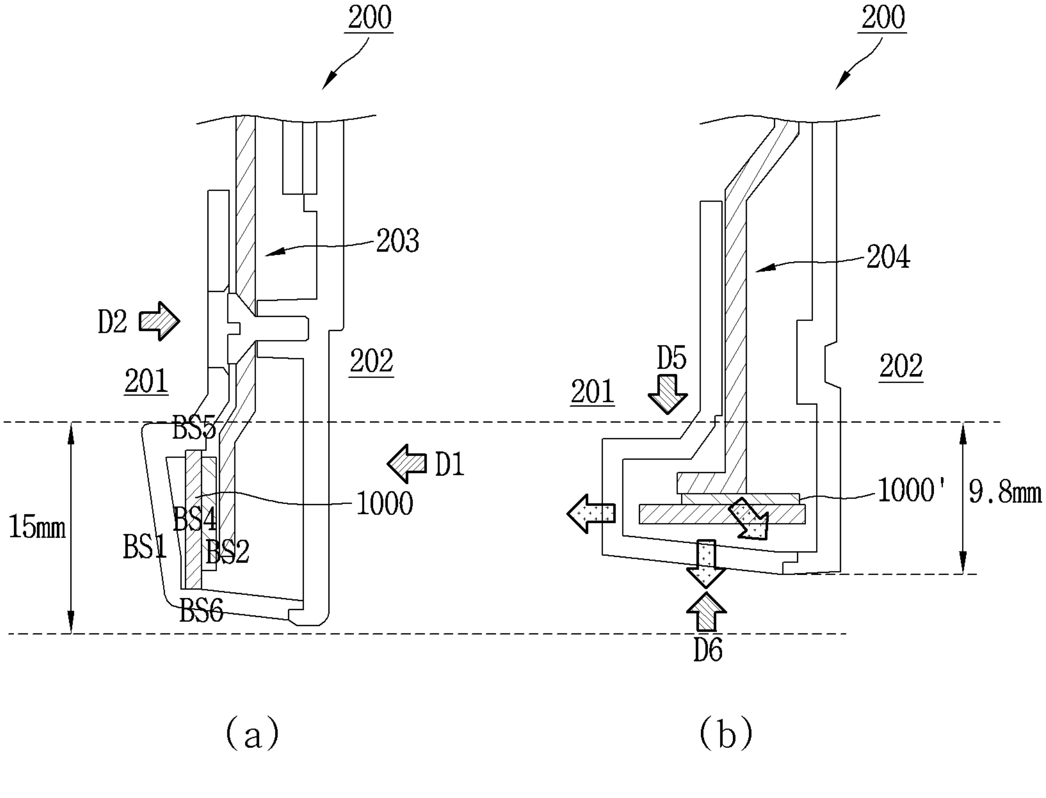
FIG. 5 shows a disposition structure of an antenna module disposed in an electronic device according to embodiments.

Meanwhile, the antenna modules 300, 310 of FIGS. 3 and 4 may be disposed in a vertical structure or a horizontal structure. In this regard, FIG. 5 shows a disposition structure of an antenna module disposed in an electronic device according to embodiments. (a) of FIG. 5 shows a first structure in which the antenna module 300 is vertically disposed. (b) of FIG. 5 shows a second structure in which the antenna module 300 is horizontally disposed.

Referring to (a) of FIG. 5, an antenna structure 1000 may be coupled to an end of a heat dissipation plate 203 disposed in a space between the first cover 201 and the second cover 202. The first cover 201 and the second cover 202 may correspond to a front cover and a rear cover, respectively. A length of a lower end of the first cover 201 to which the antenna structure 1000 is coupled may be implemented as a predetermined first length (e.g., 15 mm) or less. Upper and lower ends of the antenna structure 1000 may be coupled to upper and lower grooves of the first cover 201 to allow the antenna structure 1000 to be vertically disposed.

An end of the heat dissipation plate 203 and the antenna structure 1000 may be disposed in a vertical structure with respect to a horizontal plane. The end of the heat dissipation plate 203 and the antenna structure 1000 may be disposed in parallel with respect to the Y-axis, which is a vertical axis. To this end, the heat dissipation plate 203 may be coupled to the first and second covers 201, 202 and the antenna structure 1000 through an assembly structure such as a screw or a separate compression structure on front and rear surfaces of the heat dissipation plate 203. The assembly structure or the compression structure may be assembled or compressed in a first direction D1, which is a front direction, or in a second direction D2, which is a rear direction.

The antenna structure 1000 may include a plurality of side surfaces BS1 to BS6. A first surface BS1 of the plurality of side surfaces may be configured to face the front direction D1 of the electronic device 200, and a second surface BS2 of the plurality of side surfaces to face the rear direction D2 of the electronic device 200. A third surface (not shown) of the plurality of side surfaces may be configured to face a left direction of the electronic device 200, and a fourth surface BS4 of the plurality of side surfaces to face a right direction of the electronic device 200. A fifth surface BS5 of the plurality of side surfaces may be configured to face a bottom direction D3 of the electronic device 200.

Referring to FIG. 5(*b*), an antenna structure 1000 may be coupled to an end of a heat sink 204 disposed in a space between a first cover 201 and a second cover 202. A length of a lower end of the first cover 201 to which the antenna module 300' is coupled may be implemented as a predetermined second length (e.g., 9.8 mm) or less. One side end and a rear surface of the antenna structure 1000' may be coupled to the side region and a rear surface of the first cover 201 to allow the antenna structure 1000' to be disposed parallel to a horizontal plane. The assembly structure or the compression structure may be assembled or compressed in a fifth direction D5, which is a top direction, or in a sixth direction D6, which is a bottom direction.

An end of the heat dissipation plate 204 and the antenna structure 1000 may be disposed in a horizontal structure so as to correspond to a horizontal plane. The end of the heat dissipation plate 204 and the antenna structure 1000' may be disposed in parallel with respect to the X-axis, which is a horizontal axis. To this end, the heat dissipation plate 204 may be coupled to the first cover 201 and the antenna structure 1000' through an assembly structure such as a screw or a separate compression structure on front and rear surfaces of the heat dissipation plate 204. The assembly structure or the compression structure may be assembled or compressed in a first direction D1, which is a bottom direction, or in a second direction D2, which is a top direction.

Meanwhile, an antenna module disposed in an electronic device according to the present disclosure will be described. In this regard, FIG. 6 shows a structural view in which an electronic device provided with a display performs AV wireless communication with other communication devices that may be disposed in various locations.

Figure 6:
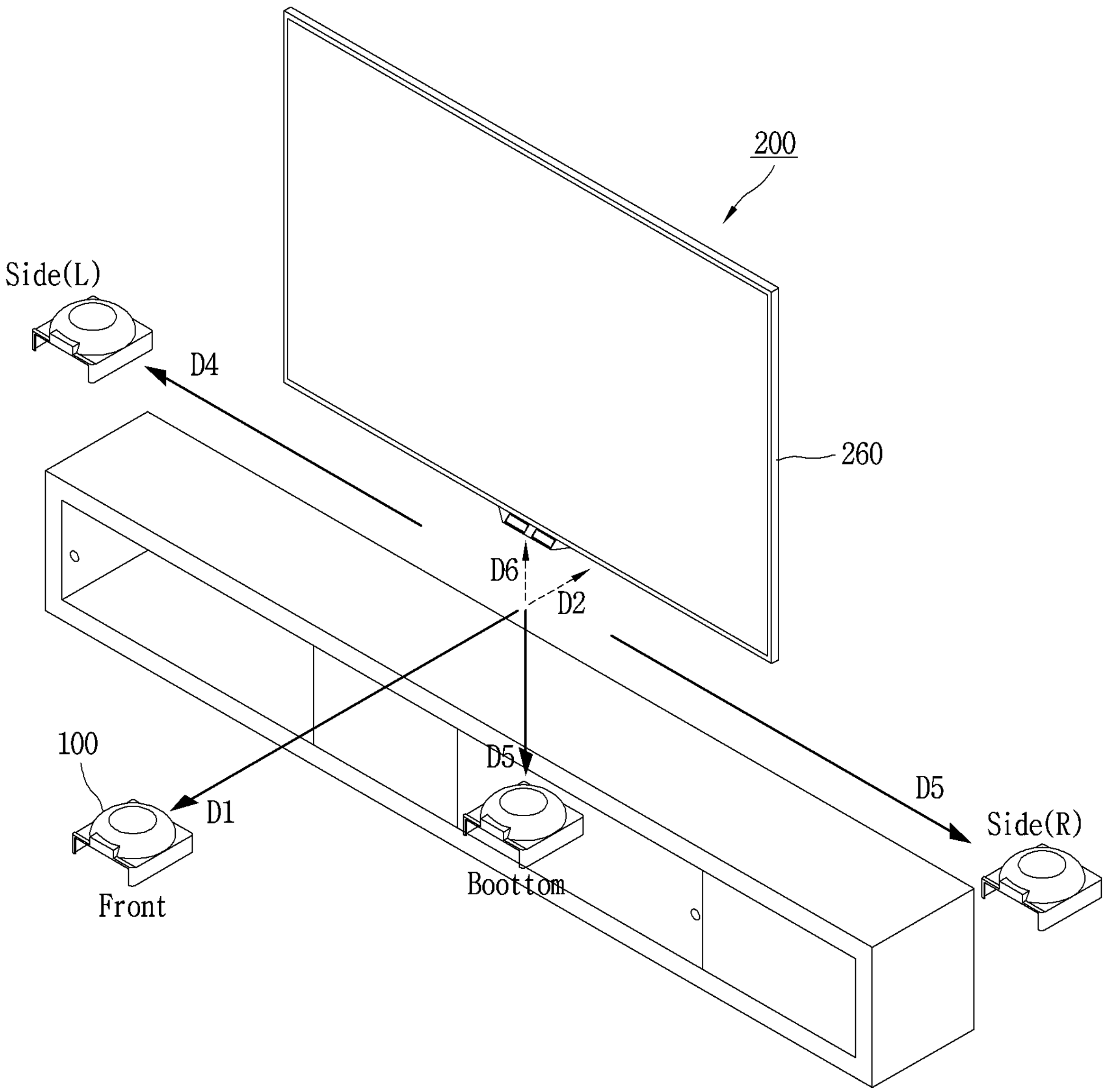
FIG. 6 shows a structural view in which an electronic device provided with a display performs AV wireless communication with other communication devices that may be disposed in various locations.

Referring to FIG. 6, the communication device 100 may be disposed in a front direction, a bottom direction, one side direction, or the other side direction of the electronic device 200. The communication device 100 may be an AV transmitting device that transmits AV content to the electronic device 200. The communication device 100 may be a set-top box, but is not limited thereto. The electronic device 200 may be an AV receiving device that receives AV content from the communication device 100. The electronic device 200 may be a display device, but is not limited thereto. The electronic device 200 receives data from the communication device 100, but may also transmit data to the communication device 100.

The communication device 100 may be disposed in the first direction D1 that is the front direction of the electronic device 200. In this regard, the electronic device 200 may transmit or receive a wireless signal in the first direction D1, which is the front direction. A rear direction of the electronic device 200 may be defined as the second direction D2.

The communication device 100 may be disposed in the third direction D3, which is the left direction of the electronic device 200, or in the fourth direction D4, which is the right direction thereof. In this regard, the electronic device 200 may transmit or receive a wireless signal in the fourth direction D4 or the fifth direction D5, which is the left direction.

The communication device 100 may be disposed in the fifth direction D5 that is the bottom direction of the electronic device 200. In this regard, the electronic device 200 may transmit or receive a radio signal in the fifth direction D5, which is the bottom direction. The top direction of the electronic device 200 may be defined as the sixth direction D6.

Meanwhile, a wireless link on a line-of-sight (LOS) path may not be formed due to an obstacle between the communication device 100 and the electronic device 200. In this regard, the electronic device 200 may transmit and receive a wireless signal through a wireless link on a non-LOS path such as a reflection path. The communication device 100 may transmit or receive a wireless signal in a ceiling direction, which is an upper front direction. Communication is enabled between the communication device 100 and the electronic device 200 through a wireless signal reflected from a ceiling or wall surface.

Figure 7A:
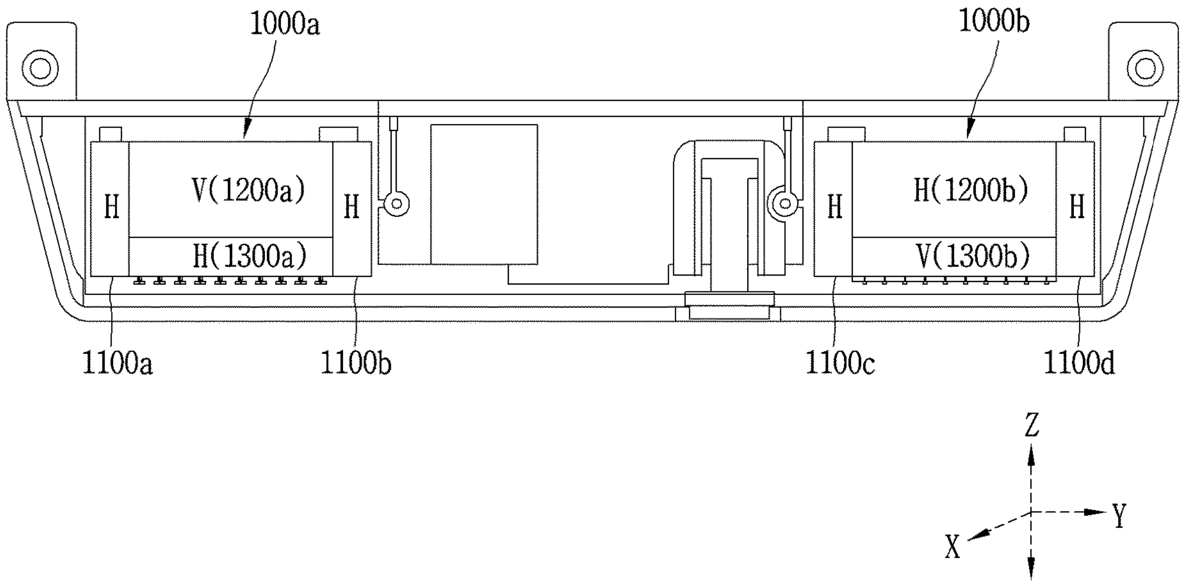
FIGS. 7A and 7B show structures of an antenna module below an electronic device.
Figure 7B:
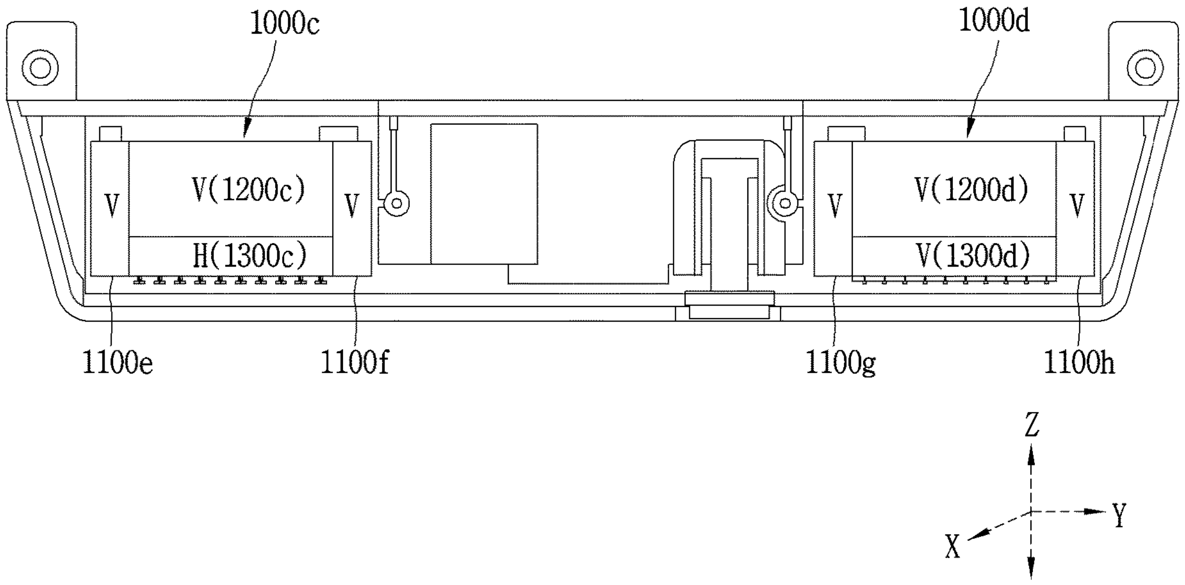

Meanwhile, an electronic device according to the present disclosure may include a plurality of antenna modules (structures) to perform wireless communication with a communication device through the plurality of antenna modules (structures). In this regard, FIGS. 7A and 7B show structures of an antenna module disposed under an electronic device according to embodiments.

Referring to FIGS. 3 to 7A, the electronic device 200 may include a display panel 260, a first antenna structure **1000*a* and a second antenna structure 1000*b*. The first and second antenna structures 1000*a*, 1000*b* may be disposed around the display panel 260. The first and second antenna structures 1000*a*, 1000*b* of FIG. 7A may correspond to the first and second antenna structures 1000*a*, 1000*b* of FIGS. 9A and 9**B, respectively.

The first antenna structure **1000*a* may be disposed in one side region of the electronic device 200. The second antenna structure 1000*b* may be disposed in the other side region of the electronic device 200**.

The first antenna structure **1000*a* may include a first array antenna 1200*a* and a second array antenna 1300*a*. The first array antenna 1200*a* operates as a horizontally polarized antenna that receives or transmit a signal in a front direction. The second array antenna 1300*a* operates as a horizontally polarized antenna that receives or transmits a signal in a bottom direction. The first array antenna 1200*a* may radiate a polarized signal that is polarized in the Y-axis direction to travel in the X-axis direction. The second array antenna 1300*a*** may radiate a polarized signal that is polarized in the Y-axis direction to travel in a lower Z-axis direction.

The first antenna structure **1000*a* may further include a third array antenna 1100*a* and a fourth array antenna 1100*b*. The third array antenna 1100*a* operates as a horizontally polarized antenna that receives or transmits a signal in a left direction. The fourth array antenna 1100*b* operates as a horizontally polarized antenna that receives or transmits a signal in a right direction. The third array antenna 1100*a* may radiate a polarized signal that is polarized in the X-axis direction to travel in a left Y-axis direction. The fourth array antenna 1100*b*** may radiate a polarized signal that is polarized in the X-axis direction to travel in a right Y-axis direction.

The second antenna structure 1000*b* may include a fifth array antenna 1200*b* and a sixth array antenna 1300*d*. The fifth array antenna 1200*b* may operate as a horizontally polarized antenna that receives or transmit a signal in a front direction. The sixth array antenna 1300*d* may operate as a vertically polarized antenna that receives or transmits a signal in a bottom direction. The fifth array antenna 1200*b* may radiate a polarized signal that is polarized in the Y-axis direction to travel in the X-axis direction. The sixth array antenna 1300*d* may radiate a polarized signal that is polarized in the X-axis direction to travel in a lower Z-axis direction.

The second antenna structure 1000*b* may further include a seventh array antenna 1100*c* and an eighth array antenna 1100*d*. The seventh array antenna 1100*c* and the eighth array antenna 1100*d* operate as horizontally polarized antennas. The seventh array antenna 1100*c* operates as a horizontally polarized antenna that receives or transmits a signal in a left direction. The eighth array antenna 1100*d* operates as a horizontally polarized antenna that receives or transmits a signal in a right direction. The seventh array antenna 1100*c* may radiate a polarized signal that is polarized in the X-axis direction to travel in a left Y-axis direction. The eighth array antenna 1100*d* may radiate a polarized signal that is polarized in the X-axis direction to travel in a right Y-axis direction.

Referring to FIGS. 3 to 6, and 7A, the electronic device 200 may include a display panel 260, a third antenna structure 1000*c* and a fourth antenna structure 1000*d*. The third and fourth antenna structures 1000*c*, 1000*d* may be disposed around the display panel 260. The third and fourth antenna structures 1000*c*, 1000*d* of FIG. 7B may correspond to the third and fourth antenna structures 1000*c*, 1000*d* of FIGS. 10A and 10B.

The third antenna structure 1000*c* may be disposed in one side region of the electronic device 200. The fourth antenna structure 1000*d* may be disposed in the other side region of the electronic device 200.

The third antenna structure 1000*c* may further include a first array antenna 1200*c* and a second array antenna 1300*c*. The first array antenna 1200*c* operates as a vertically polarized antenna that receives or transmit a signal in a front direction. The second array antenna 1300*c* operates as a horizontally polarized antenna that receives or transmits a signal in a bottom direction. The first array antenna 1200*c* may radiate a polarized signal that is polarized in the Z-axis direction to travel in the X-axis direction. The second array antenna 1300*c* may radiate a polarized signal that is polarized in the X-axis direction to travel in a lower Z-axis direction.

The third antenna structure 1000*c* may further include a third array antenna 1100*e* and a fourth array antenna 1100*f*. The third array antenna 1100*e* operates as a horizontally polarized antenna that receives or transmits a signal in a left direction. The fourth array antenna 1100*f* operates as a horizontally polarized antenna that receives or transmits a signal in a right direction. The third array antenna 1100*e* may radiate a polarized signal that is polarized in the Z-axis direction to travel in a left Y-axis direction. The fourth array antenna 1100*f* may radiate a polarized signal that is polarized in the Z-axis direction to travel in a right Y-axis direction.

The second antenna structure 1000*d* may include a fifth array antenna 1200*d* and a sixth array antenna 1300*d*. The fifth array antenna 1200*d* may operate as a vertically polarized antenna that receives or transmit a signal in a front direction. The sixth array antenna 1300*d* may operate as a vertically polarized antenna that receives or transmits a signal in a bottom direction. The fifth array antenna 1200*d* may radiate a polarized signal that is polarized in the Z-axis direction to travel in the X-axis direction. The sixth array antenna 1300*d* may radiate a polarized signal that is polarized in the Y-axis direction to travel in a lower Z-axis direction.

The second antenna structure 1000*b* may further include a seventh array antenna 1100*g* and an eighth array antenna 1100*h*. The seventh array antenna 1100*g* operates as a vertically polarized antenna that receives or transmits a signal in a left direction. The eighth array antenna 1100*h* operates as a vertically polarized antenna that receives or transmits a signal in a right direction. The seventh array antenna 1100*g* may radiate a polarized signal that is polarized in the Z-axis direction to travel in a left Y-axis direction. The eighth array antenna 1100*h* may radiate a polarized signal that is polarized in the Z-axis direction to travel in a right Y-axis direction.

Figure 8A:
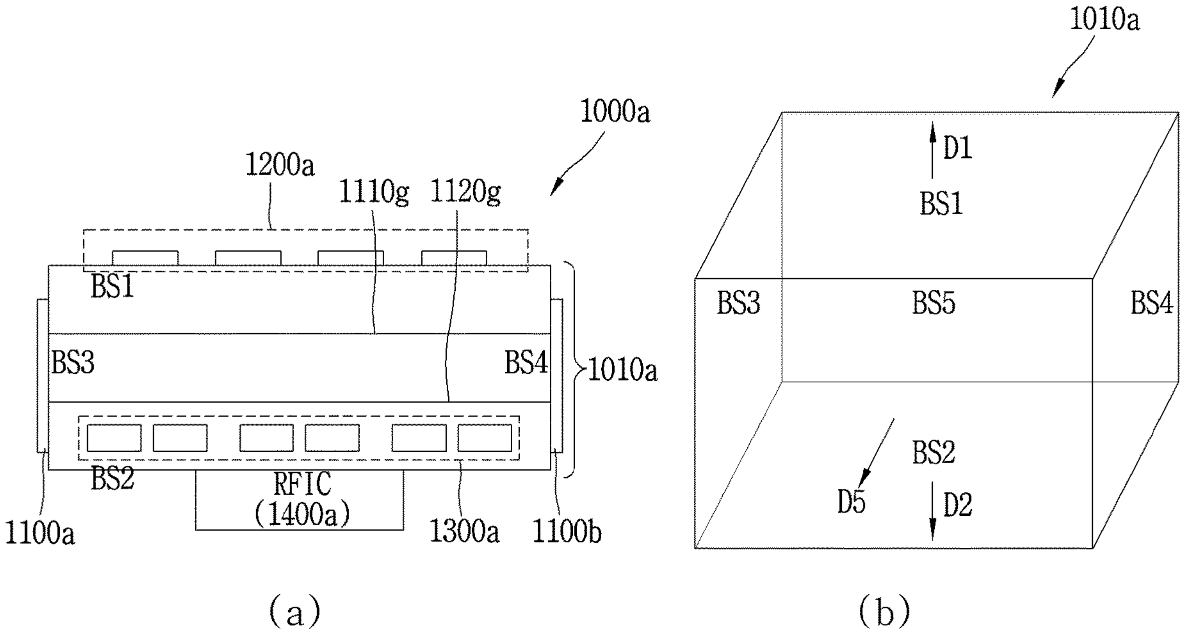
FIGS. 8A and 8B show cross-sectional views of first and second antenna structures implemented in first and second PCBs of the antenna disposition structure in (a) of FIG. 5.
Figure 8B:
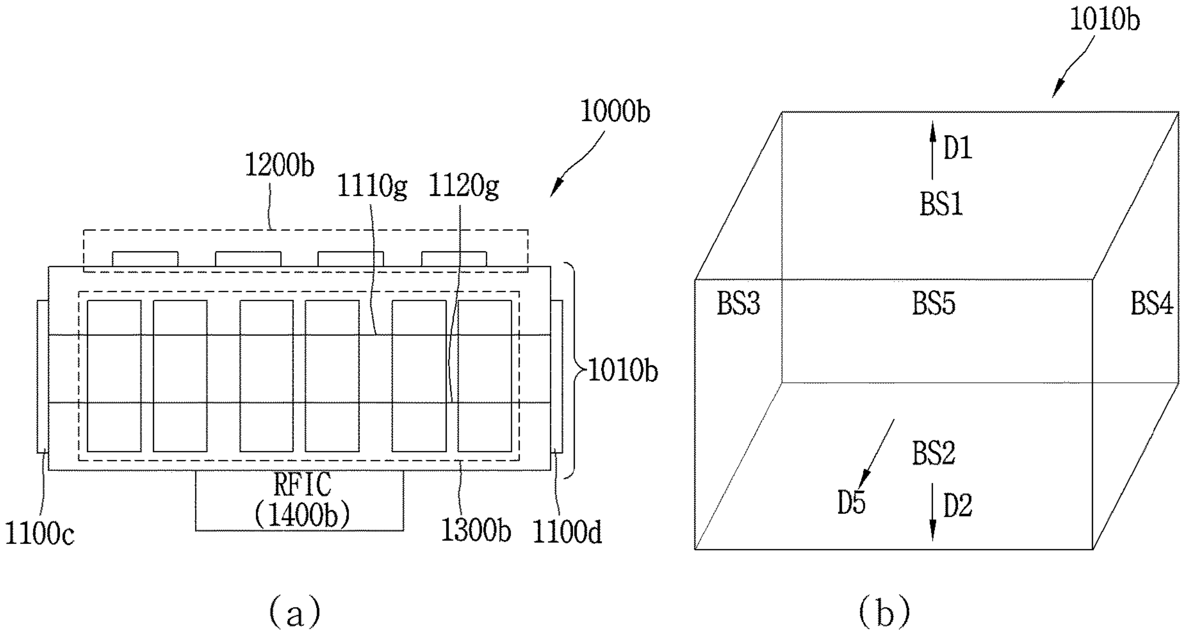
Figure 8C:
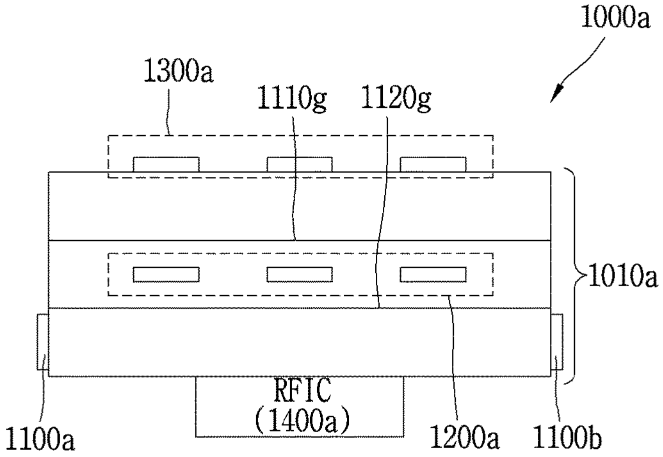
FIGS. 8C and 8D show cross-sectional views of first and second antenna structures implemented in first and second PCBs of the antenna disposition structure in (b) of FIG. 5.
Figure 8C:
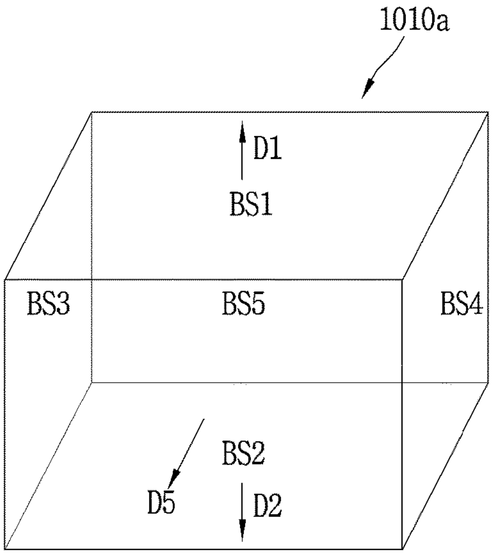
Figure 8D:
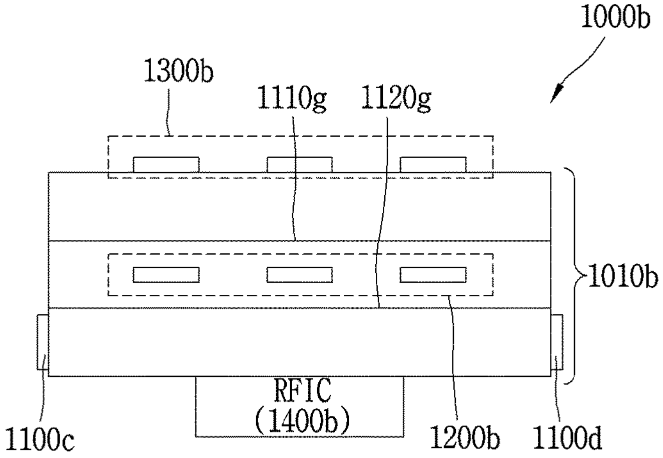
Figure 8D:
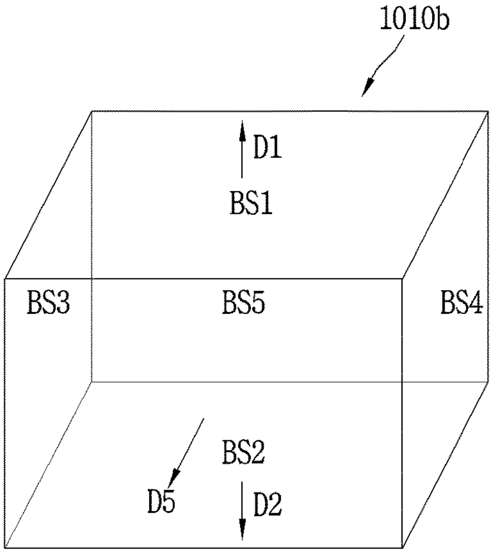

Meanwhile, the first and second antenna structures disposed in the electronic device may be configured with a multi-layer substrate structure. The first and second antenna structures may be implemented as a printed circuit board (PCB) structure. In this regard, FIGS. 8A and 8B show cross-sectional views of first and second antenna structures implemented in first and second PCBs of the antenna disposition structure in (a) of FIG. 5. FIGS. 8C and 8D show cross-sectional views of first and second antenna structures implemented in first and second PCBs of the antenna disposition structure in (b) of FIG. 5.

(a) of FIG. 8A shows a cross-sectional view of a first antenna structure 1000*a* disposed in the antenna disposition structure in (a) of FIG. 5 and implemented with a first PCB 1010*a*. (b) of FIG. 8A shows a three-dimensional structure of a first PCB 1010*a* configured with a first surface BS1, and a second surface BS2 to a fifth surface BS5.

(a) of FIG. 8B shows a cross-sectional view of a second antenna structure 1000*b* disposed in the antenna disposition structure in (a) of FIG. 5 and implemented with a second PCB 1010*b*.

(b) of FIG. 8B shows a three-dimensional structure of the second PCB 1010*b* configured with a first surface BS1, and a second surface BS2 to a fifth surface BS5.

(a) of FIG. 8C shows a cross-sectional view of a first antenna structure 1000*a* disposed in the antenna disposition structure in (b) of FIG. 5 and implemented with a first PCB 1010*a*. (b) of FIG. 8C shows a three-dimensional structure of a first PCB 1010*a* configured with a first surface BS1, and a second surface BS2 to a fifth surface BS5.

(a) of FIG. 8D shows a cross-sectional view of a second antenna structure 1000*b* disposed in the antenna disposition structure in (b) of FIG. 5 and implemented with a second PCB 1010*b*.

(b) of FIG. 8D shows a three-dimensional structure of a second PCB 1010*b* configured with a first surface BS1, and a second surface BS2 to a fifth surface BS5.

In this regard, the first and second antenna structures of FIGS. 8A to 8D may correspond to the first and second antenna structures 1000*a*, 1000*b* of FIG. 7A. Accordingly, in the first and second antenna structures of FIGS. 8A to 8D, array antennas disposed on front and side surfaces operate as horizontally polarized antennas, and array antennas disposed on lower surfaces operate as horizontally or vertically polarized antennas.

Referring to FIGS. 4 to 7A, 8A, and 8C, the first antenna structure 1000*a* may include a first PCB 1010*a* constituting a multi-layer structure, a first array antenna 1200*a*, and a second array antenna 1300*a*, and a first wireless communication IC 1400*a*. Furthermore, the first antenna structure 1000*a* may further include a third array antenna 1100*a* and a fourth array antenna 1100*b* disposed on left and right side surfaces. A plurality of ground layers 1110*g*, 1120*g* may be disposed inside the first PCB 1010*a* to maintain interference between signals of the plurality of array antennas at a predetermined level or less.

The first PCB 1010*a* may constitute a plurality of side surfaces. The first PCB 1010*a* may include first to fifth surfaces BS1 to BS5. A first surface BS1 of the plurality of side surfaces may be configured to face the front direction D1 of the electronic device 200, and a second surface BS2 of the plurality of side surfaces to face the rear direction D2 of the electronic device 200. A third surface BS3 of the plurality of side surfaces may be configured to face a left direction of the electronic device 200, and a fourth surface BS4 of the plurality of side surfaces to face a right direction of the electronic device 200. A fifth surface BS5 of the plurality of side surfaces may be configured to face a bottom direction D3 of the electronic device 200.

The first surface BS1 may be configured to face a first direction (front direction) D1. The second surface BS2 may be configured to face a second direction (rear direction) D2 opposite to the first direction D1. The third to fifth surfaces BS3 to BS5 may be configured to surround a space between the first and second surfaces BS1, BS2.

The first array antenna 1200*a* may be disposed on the first surface BS1 between the third and fourth surfaces BS3, BS4. The second array antenna 1300*a* may be disposed on the fifth surface BS5 between the third and fourth surfaces BS3, BS4. The first array antenna 1200*a* may form a beam pattern in the first direction D1. The second array antenna 1300*a* may form a beam pattern in the fifth direction D5. The first wireless communication IC 1400*a* may be disposed on the second surface BS2. The first wireless communication IC 1400*a* may transmit or receive a wireless signal in a first frequency range.

Referring to FIGS. 4 to 6, 7B, 8B, and 8D, the second antenna structure 1000*b* constituting a multi-layer structure may include a second PCB 1010*b*, a fifth array antenna 1200*b*, a sixth array antenna 1300*b*, and a second wireless communication IC 1400*b*. Furthermore, the second antenna structure 1000*b* may further include a seventh array antenna 1100*c* and an eighth array antenna 1100*d* disposed on left and right side surfaces. A plurality of ground layers 1110*g*, 1120*g* may be disposed inside the second PCB 1010*b* to maintain interference between signals of the plurality of array antennas at a predetermined level or less.

The second PCB 1010*b* may constitute a plurality of side surfaces. The second PCB 1010*b* may include first to fifth surfaces BS1 to BS5. A first surface BS1 of the plurality of side surfaces may be configured to face the front direction D1 of the electronic device 200, and a second surface BS2 of the plurality of side surfaces to face the rear direction D2 of the electronic device 200. A third surface BS3 of the plurality of side surfaces may be configured to face a left direction of the electronic device 200, and a fourth surface BS4 of the plurality of side surfaces to face a right direction of the electronic device 200. A fifth surface BS5 of the plurality of side surfaces may be configured to face a bottom direction D3 of the electronic device 200.

The first surface BS1 may be configured to face a first direction (front direction) D1. The second surface BS2 may be configured to face a second direction (rear direction) D2 opposite to the first direction D1. The third to fifth surfaces BS3 to BS5 may be configured to surround a space between the first and second surfaces BS1, BS2.

The fifth array antenna 1200*b* may be disposed on the first surface BS1 between the third and fourth surfaces BS3, BS4. The sixth array antenna 1300*b* may be disposed on the fifth surface BS5 between the third and fourth surfaces BS3, BS4. The fifth array antenna 1200*b* may form a beam pattern in the first direction D1. The sixth array antenna 1300*b* may form a beam pattern in the fifth direction D5. The second wireless communication IC 1400*b* may be disposed on the second surface BS2. The second wireless communication IC 1400*b* may transmit or receive a wireless signal in a first frequency range.

The polarization of the first array antenna 1200*a* may be the same as that of the fifth array antenna 1200*b*. The first array antenna 1200*a* may radiate a polarized signal that is polarized in the Y-axis direction to travel in the X-axis direction. The fifth array antenna 1200*b* may radiate a polarized signal that is polarized in the Y-axis direction to travel in the X-axis direction.

A signal traveling in the X-axis direction, which is a front direction, corresponds to a horizontally polarized signal when polarized in the Y-axis direction, and corresponds to a vertically polarized signal when polarized in the Z-axis direction. Accordingly, the first array antenna 1200*a* and the fifth array antenna 1200*b* may radiate a horizontally polarized signal in the Y-axis direction. The horizontally polarized signal may be a signal in which an electric field is formed in the Y-axis direction corresponding to a length of the first antenna structure 1000*a*.

The polarization of the third array antenna 1100*a* may be the same as that of the fourth array antenna 1100*b*. The third array antenna 1100*a* may radiate a polarized signal that is polarized in the X-axis direction to travel in a left Y-axis direction. The fourth array antenna 1100*b* may radiate a polarized signal that is polarized in the X-axis direction to travel in a right Y-axis direction.

A signal traveling in the Y-axis direction, which is a lateral direction, corresponds to a horizontally polarized signal when polarized in the X-axis direction, and corresponds to a vertically polarized signal when polarized in the Z-axis direction. Accordingly, the third array antenna 1100*a* and the fourth array antenna 1100*b* may radiate a horizontally polarized signal in the X-axis direction.

The polarization of the second array antenna 1300*a* may be different from that of the fourth array antenna 1300*b*. The polarization of the second array antenna 1300*a* may be orthogonal to that of the sixth array antenna 1300*b*. The second array antenna 1300*a* may radiate a polarized signal that is polarized in the Y-axis direction to travel in a lower Z-axis direction. The sixth array antenna 1300*b* may radiate a polarized signal that is polarized in the X-axis direction to travel in a lower Z-axis direction.

A signal traveling in the Z-axis direction corresponds to a horizontally polarized signal when polarized in the Y-axis direction, and corresponds to a vertically polarized signal when polarized in the X-axis direction. Accordingly, the second array antenna 1300*a* may radiate a horizontally polarized signal in the Y-axis direction. The sixth array antenna 1300*b* may radiate a vertically polarized signal in the X-axis direction. As another example, the second array antenna 1300*a* may radiate a vertically polarized signal, and the sixth array antenna 1300*b* may radiate a horizontally polarized signal.

The polarization of the seventh array antenna 1100*c* may be the same as that of the eighth array antenna 1100*d*. The third array antenna 1100*c* may radiate a polarized signal that is polarized in the X-axis direction to travel in a left Y-axis direction. The eighth array antenna 1100*d* may radiate a polarized signal that is polarized in the X-axis direction to travel in a right Y-axis direction. Accordingly, the seventh array antenna 1100*c* and the eighth array antenna 1100*d* may radiate a horizontally polarized signal in the X-axis direction.

The communication device 100 that transmits and receives a wireless signal to and from the electronic device 200 may radiate a horizontally polarized signal. When the communication device 100 is located in a front or side region of the electronic device 200, both the first and second antenna structures 1000*a*, 1000*b* may operate. Meanwhile, when the communication device 100 is located in a bottom region of the electronic device 200, either one of the first and second antenna structures 1000*a*, 1000*b* may operate.

When the communication device 100 is located in a front region of the electronic device 200, all the array antennas 1200*a*, 1200*b* located on front sides of the first and second antenna structures 1000*a*, 1000*b*, respectively, which are operable with co-polarization, operate to communicate simultaneously. The co-polarization may be either one of horizontal polarization or vertical polarization on a bottom surface in a front communication region.

When located in a left side region of the electronic device 200, the communication device 100 simultaneously communicates with antennas located at left side portions of the first and second antenna structures 1000*a*, 1000*b*, respectively, which are operable with co-polarization. The co-polarization may be either one of horizontal polarization or vertical polarization on a bottom surface in a lateral communication region.

When located in a right side region of the electronic device 200, the communication device 100 simultaneously communicates with antennas located at right side portions of the first and second antenna structures 1000*a*, 1000*b*, respectively, which are operable with co-polarization. The co-polarization may be either one of horizontal polarization or vertical polarization on a bottom surface in a lateral communication region.

Therefore, when the communication device 100 is located in one of left and right side regions of the electronic device 200, all the array antennas located on the corresponding side surfaces of the first and second antenna structures 1000*a*, 1000*b* may operate. Meanwhile, when the communication device 100 is located in a bottom region of the electronic device 200, either one of the array antennas 1300*a*, 1300*b* located on lower surfaces of the first and second antenna structures 1000*a*, 1000*b* operates.

In this regard, when the communication device 100 is located in a bottom region of the electronic device 200, the communication device 100 may operate with either one of the first and second antenna structures 1000*a*, 1000*b*, which are operable with different polarizations. When the communication device 100 is located to provide polarization in parallel to a wall surface, the first antenna structure 1000*a* may provide the same polarization. In this case, the antenna of the communication device 100 communicates with the first antenna structure 1000*a* of the electronic device 200. The communication device 100 is unable to communicate with the second antenna structure 1000*b* of the electronic device 200.

When located in a bottom region of the electronic device 200, the communication device 100 may operate with either one of the first and second antenna structures 1000*a*, 1000*b*, which are operable with different polarizations. When the communication device 100 is located to provide polarization perpendicular a wall surface, the second antenna structure 1000*b* may provide the same polarization. In this case, the antenna of the communication device 100 communicates with the second antenna structure 1000*b* of the electronic device 200. The communication device 100 is unable to communicate with the first antenna structure 1000*a* of the electronic device 200.

When the communication device 100 is located in a front region, patch array antennas on front sides of the first and second antenna structures 1000*a*, 1000*b*, respectively, may radiate polarized signals capable of communicating with the communication device 100. The polarized signal may be either horizontally polarized or vertically polarized.

When the communication device 100 is located in a side region, antennas on one side surface the side array antennas of the first and second antenna structures 1000*a*, 1000*b*, respectively, may radiate polarized signals capable of communicating with the communication device 100. The polarized signal may be either horizontally polarized or vertically polarized.

When the communication device 100 is located in a bottom region, the first wireless communication IC 1400*a* may control a horizontally polarized signal to be received and transmitted through the second array antenna 1300*a* of the first antenna structure 1000*a*.

The communication device 100 may be located in the bottom region, and the second wireless communication IC 1400*b* may receive or transmit a vertically polarized signal through the sixth array antenna 1300*b* of the second antenna structure 1000*b*.

Figure 9A:
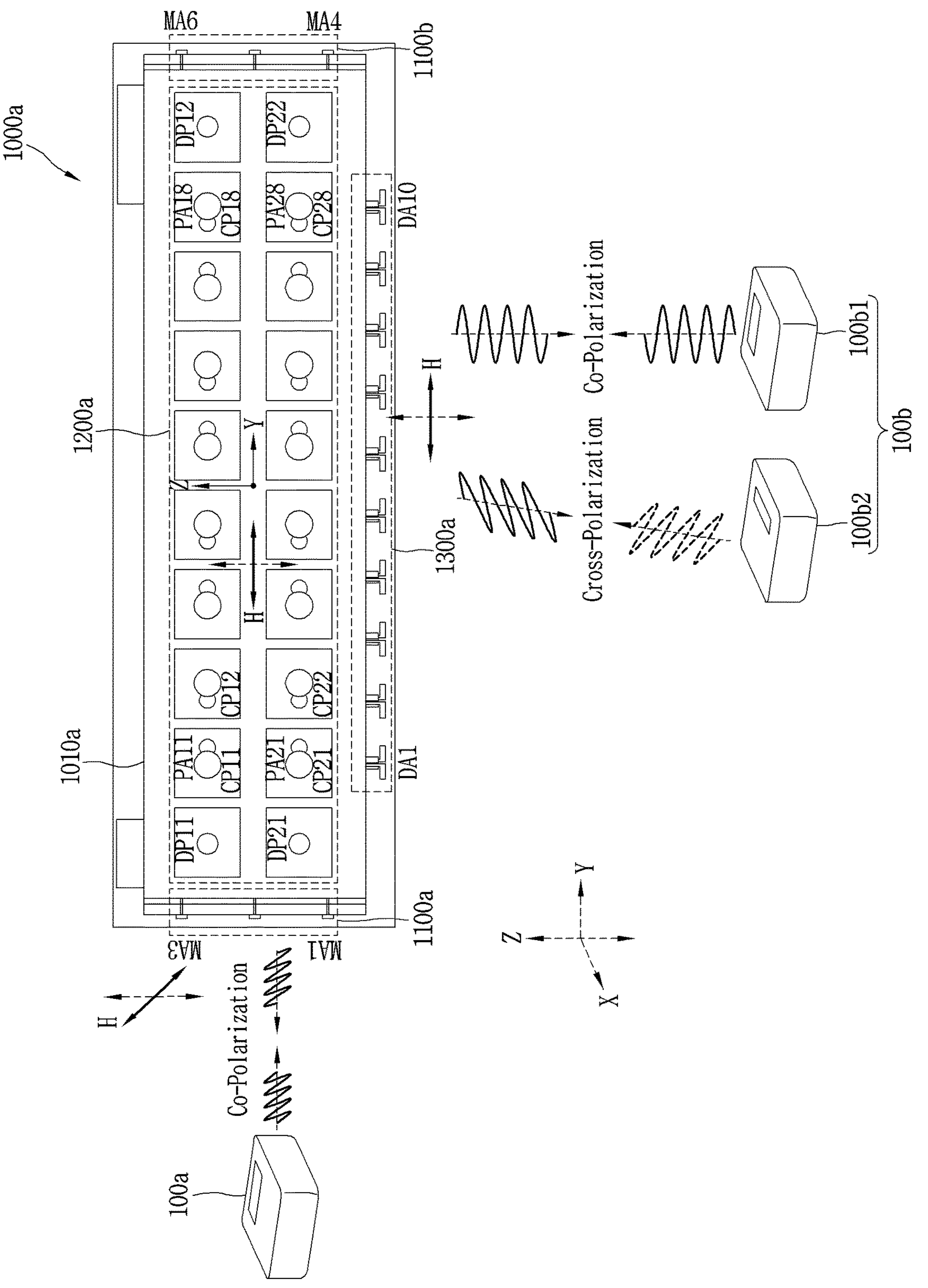
FIG. 9A shows a structure in which a first antenna structure provided with a plurality of antenna arrays, having the antenna disposition structure in (a) of FIG. 5, performs wireless communication with communication devices at various locations.
Figure 9B:
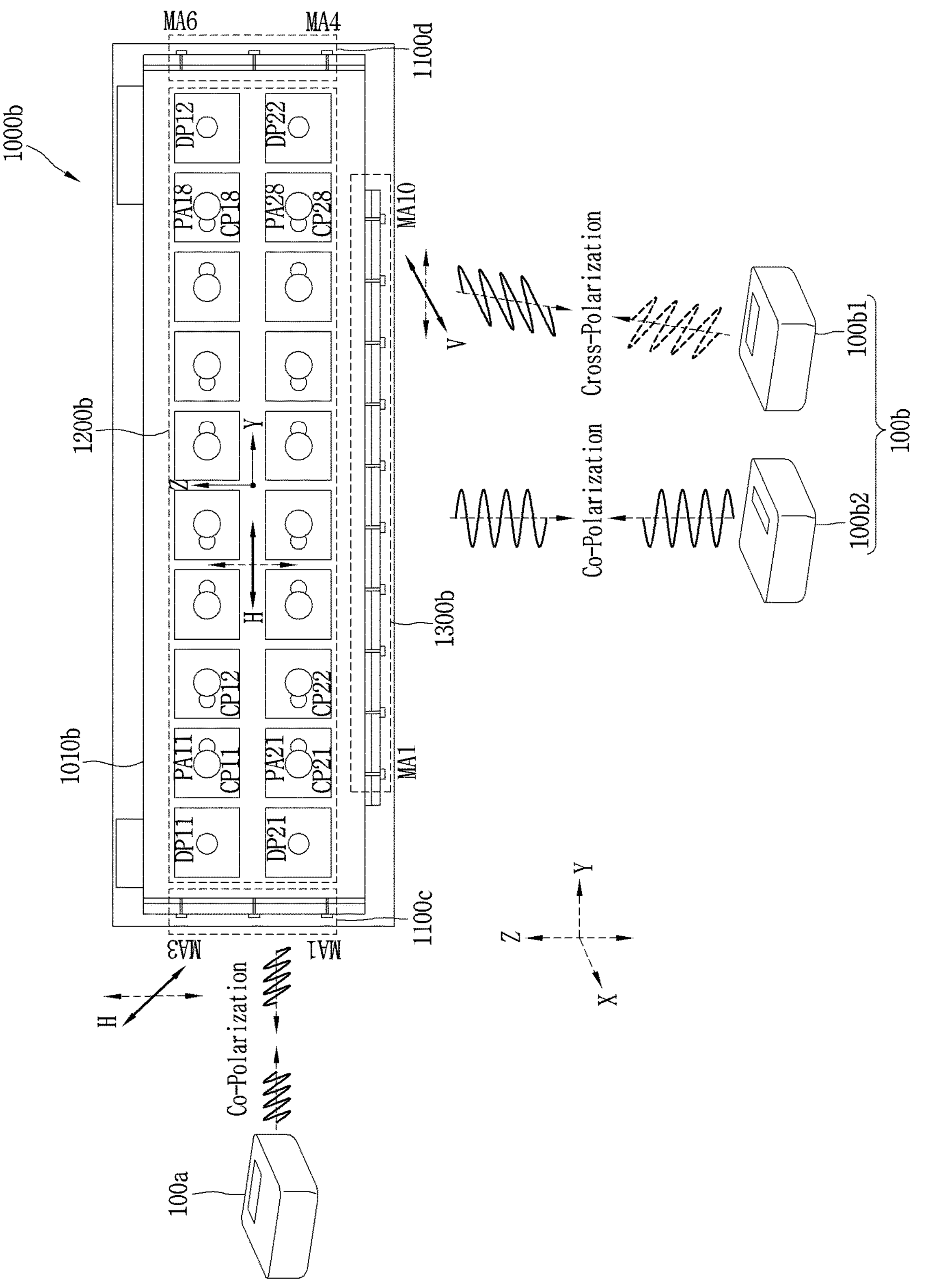
FIG. 9B shows a structure in which a second antenna structure provided with a plurality of antenna arrays, having the antenna disposition structure in (a) of FIG. 5, performs wireless communication with communication devices at various locations.

Meanwhile, in the first and second antenna structures disposed in the electronic device according to the present disclosure, a plurality of array antennas may be disposed in different regions of the PCB. In this regard, FIG. 9A shows a structure in which a first antenna structure provided with a plurality of antenna arrays, having the antenna disposition structure in (a) of FIG. 5, performs wireless communication with communication devices at various locations. FIG. 9B shows a structure in which a second antenna structure provided with a plurality of antenna arrays, having the antenna disposition structure in (a) of FIG. 5, performs wireless communication with communication devices at various locations.

Referring to (a) of FIG. 5, and FIGS. 7A, 8A, and 9A, the first antenna structure 1000*a* may include a first array antenna 1200*a*, a second array antenna 1300*a*, a third array antenna 1100*a*, and a fourth array antenna 1100*b*.

The communication device 100*a* may be disposed in one side region of the first antenna structure 1000*a*. The communication device 100*a* may have an array antenna that transmits and receives a horizontally polarized signal.

The array antenna of the communication device 100*a* may be implemented with 16 or 32 antenna elements. A sum of the number of elements of the array antenna of the communication device 100*a* may be equal to a sum of the number of elements of the array antennas of the first antenna structure 1000*a* or the second antenna structure 1000*b*.

The number of elements of the array antenna of the communication device 100*a* may be equal to a sum of the number of elements of the first array antenna 1200*a* of the first antenna structure 1000*a* and the number of elements of the fifth array antenna 1300*a* of the second antenna structure 1000*b*. The number of elements of the array antenna of the communication device 100*a* may be larger than a sum of the number of elements of the second array antenna 1200*b* of the first antenna structure 1000*a* and the number of elements of the sixth array antenna 1300*b* of the second antenna structure 1000*b*.

The communication device 100*b* may be disposed in a bottom region of the first antenna structure 1000*a*. The communication device 100*b* may include an array antenna that transmits and receives a horizontally polarized signal. The array antenna of the communication device 100*b* may be implemented with 16 or 32 antenna elements.

The third array antenna 1100*a* may include a plurality of monopole antennas MA1 to MA3 disposed in one side region of the first PCB 1010*a*. The fourth array antenna 1100*b* may include a plurality of monopole antennas MA4 to MA6 disposed in the other side region of the first PCB 1010*a*.

The third array antenna 1100*a* may be implemented with a 1×3 array antenna in one side region of the first PCB 1010*a*, but is not limited thereto. The fourth array antenna 1100*b* may be implemented with a 1×3 array antenna in the other side region of the first PCB 1010*a*, but is not limited thereto.

The third and fourth array antennas 1100*a*, 1100*b* may transmit and receive a horizontally polarized signal to one side region and the other side region. The third array antenna 1100*a* may transmit a horizontally polarized signal to the communication device 100*a* disposed in one side region and receive the horizontally polarized signal therefrom. The communication device 100*a* and the third array antenna 1100*a* may transmit and receive a wireless signal having co-polarization.

The first array antenna 1200*a* may include a plurality of patch antennas PA11 to PA18, PA21 to PA28 disposed in a front region of the first PCB 1010*a*. Coupling patches CP11 to CP18, CP21 to CP28 may be disposed at positions offset from the center of the patch antennas PA11 to PA18, PA21 to PA28 in left and right directions in the Y-axis direction, which is a horizontal direction. Dummy pads DP11, DP21 may be disposed on one side of the patch antennas PA11, P21 to suppress side surface radiation. Dummy patch antennas DP12, DP22 may be disposed on the other side of the patch antennas PA11, P21 to suppress lateral radiation. The first array antenna 1200*a* may be implemented with 16 2×8 array antennas, but is not limited thereto.

The first array antenna 1200*a* may transmit and receive a horizontally polarized signal to and from a front region. The first array antenna 1200*a* may transmit a horizontally polarized signal to the communication device disposed in a front region and receive the horizontally polarized signal therefrom. The communication device and the first array antenna 1200*a* may transmit and receive a wireless signal having co-polarization.

The second array antenna 1300*a*, which is a bottom antenna of the first antenna structure 1000*a*, may include a plurality of dipole antennas DA1 to DA10 disposed in a bottom region of the first PCB. The second array antenna 1300*a* may be implemented with 10 1×10 array antennas, but is not limited thereto.

The second array antenna 1300*a* may transmit and receive a horizontally polarized signal to and from a bottom region. The second array antenna 1300*a* may transmit a horizontally polarized signal to the communication device 100*b* disposed in a bottom region and receive the horizontally polarized signal therefrom. The communication device 100*a* and the second array antenna 1300*a* may transmit and receive a wireless signal having co-polarization.

The communication device 100*b* may be disposed in a rotation state at an arbitrary angle. The communication device 100*b*1 in a first rotation state and the second array antenna 1300*a* may transmit and receive a horizontally polarized signal having co-polarization. Meanwhile, the communication device 100*b*2 in a second rotation state may be located in a state in which a polarized signal of the electronic device 200 is not transmitted or received. The second rotation state is a state rotated within a predetermined angle range based on 90 degrees with respect to the first rotation state. A vertically polarized signal of the communication device 100*b*2 in the second rotation state and a horizontally polarized signal of the second array antenna 1300*a* have an orthogonal cross-polarization. Therefore, wireless communication performance between the communication device 100*b* in the second rotation state and the first antenna structure 1000*a* may be reduced or communication may not be performed.

As a result, the sixth array antenna 1300*b*, which is a bottom antenna of the second antenna structure 1000*b*, may be configured to transmit and receive a vertically polarized signal to and from the communication device 100*b* in the second rotation state.

The communication device 100*a* may be disposed in one side region of the first antenna structure 1000*a*. The communication device 100*a* may have an array antenna that transmits and receives a horizontally polarized signal. The array antenna of the communication device 100*a* may be implemented with 16 or 32 antenna elements.

The communication device 100*b* may be disposed in a bottom region of the electronic device 200. The communication device 100*b* may include an array antenna that transmits and receives a horizontally polarized signal. The array antenna of the communication device 100*b* may be implemented with 16 or 32 antenna elements.

The third array antenna 1100*a* may include a plurality of monopole antennas MA1 to MA3 disposed in one side region of the first PCB 1010*a*. The fourth array antenna 1100*b* may include a plurality of monopole antennas MA1 to MA3 disposed in the other side region of the first PCB 1010*a*.

The third array antenna 1100*a* may be implemented with a 1×3 array antenna in one side region of the first PCB 1010*a*, but is not limited thereto. The fourth array antenna 1100*b* may be implemented with a 1×3 array antenna in the other side region of the first PCB 1010*a*, but is not limited thereto.

The third and fourth array antennas 1100*a*, 1100*b* may transmit and receive a horizontally polarized signal to one side region and the other side region. The third array antenna 1100*a* may transmit a horizontally polarized signal to the communication device 100*a* disposed in one side region and receive the horizontally polarized signal therefrom. The communication device 100*a* and the third array antenna 1100*a* may transmit and receive a wireless signal having co-polarization.

Referring to (a) of FIG. 5, and FIGS. 7A, 8B, and 9B, the second antenna structure 1000*b* may include a fifth array antenna 1200*b*, a sixth array antenna 1300*b*, a seventh array antenna 1100*c*, and an eighth array antenna 1100*d*.

The fifth array antenna 1200*b* may include a plurality of patch antennas PA11 to PA18, PA21 to PA28 disposed in a front region of the second PCB 1010*b*. Coupling patches CP11 to CP18, CP21 to CP28 may be disposed at positions offset from the center of the patch antennas PA11 to PA18, PA21 to PA28 in left and right directions in the Y-axis direction, which is a horizontal direction. Dummy pads DP11, DP21 may be disposed on one side of the patch antennas PA11, P21 to suppress side surface radiation. Dummy patch antennas DP12, DP22 may be disposed on the other side of the patch antennas PA11, P21 to suppress lateral radiation. The first array antenna 1200*a* may be implemented with 16 2×8 array antennas, but is not limited thereto.

The fifth array antenna 1200*b* may transmit and receive a horizontally polarized signal to and from a front region. The fifth array antenna 1200*b* may transmit a horizontally polarized signal to the communication device disposed in a front region and receive the horizontally polarized signal therefrom. The communication device and the first array antenna 1200*a* may transmit and receive a wireless signal having co-polarization.

The sixth array antenna 1300*b* may include a plurality of monopole antennas MA1 to MA10 disposed in a bottom region of the second PCB 1010*b*. The sixth array antenna 1300*b* may be implemented with 10 1×10 array antennas, but is not limited thereto.

The sixth array antenna 1300*b* may transmit and receive a vertically polarized signal to and from a bottom region. The sixth array antenna 1300*b* may transmit a vertically polarized signal to the communication device 100*b* disposed in a bottom region and receive the vertically polarized signal therefrom. The communication device 100*a* and the sixth array antenna 1300*d* may transmit and receive a wireless signal having co-polarization.

The respective antennas of the first and second antenna structures 1000*a*, 1000*b* may be implemented with array antennas having the same structure or different structures. The first array antenna 1200*a* of the first antenna structure 1000*a* and the fifth array antenna 1200*b* of the second antenna structure 1000*b* may be implemented with array antennas having the same structure. The first array antenna 1200*a* of the first antenna structure 1000*a* is a 2×8 array patch antenna, and the fifth array antenna 1200*b* of the second antenna structure 1000*b* is a 2×8 array patch antenna. A feed location of the patch antenna may be disposed at a location biased to one side from a horizontal central axis corresponding to the Y-axis.

The second array antenna 1300*a* of the first antenna structure 1000*a* and the sixth array antenna 1300*b* of the second antenna structure 1000*b* may be implemented with array antennas having different structures. The second array antenna 1300*a* of the first antenna structure 1000*a* may be a 1×10 array dipole antenna, and the sixth array antenna 1300*b* may be a 1×10 array monopole antenna. The polarization characteristics of the second array antenna 1300*a* and the sixth array antenna 1300*b* may be implemented to have a difference of 90 degrees.

The communication device 100*b* may be disposed in a rotation state at an arbitrary angle. The horizontally polarized signal of the communication device 100*b*1 in a first rotation state and the vertical polarized signal of the sixth array antenna 1300*b* have an orthogonal cross-polarization.

Meanwhile, the communication device 100*b*2 in a second rotation state may transmit and receive a vertically polarized signal. The second rotation state is a state rotated within a predetermined angle range based on 90 degrees with respect to the first rotation state. The vertically polarized signal of the communication device 100*b*2 in the second rotation state and the vertically polarized signal of the sixth array antenna 1300*b* have the same polarization (co-polarization). Accordingly, wireless communication performance between the communication device 100*b* in the second rotation state and the second antenna structure 1000*b* may be improved.

The seventh array antenna 1100*c* may be implemented with a 1×3 array antenna in one side region of the second PCB 1010*b*, but is not limited thereto. The eighth array antenna 1100*d* may be implemented with a 1×3 array antenna in the other side region of the second PCB, but is not limited thereto.

The seventh and eighth array antennas 1100*c*, 1100*d* may transmit and receive a horizontally polarized signal to one side region and the other side region. The seventh array antenna 1100*c* may transmit a horizontally polarized signal to the communication device 100*a* disposed in one side region and receive the horizontally polarized signal therefrom. The communication device 100*a* and the seventh array antenna 1100*c* may transmit and receive a wireless signal having co-polarization.

The array antennas disposed on side surfaces of the first and second antenna structures 1000*a*, 1000*b* may receive a signal from or transmit a signal to the communication device disposed on side surfaces of the electronic device. In this regard, the first antenna structure 1000*a* may further include third and fourth array antennas 1100*a*, 1100*b*, which are monopole antennas in a 1×3 array, on left and right sides of the first array antenna 1200*a*, respectively. The second antenna structure 1000*b* may further include seventh and eighth array antennas 1100*c*, 1100*d*, which are monopole antennas in a 1×3 array, on left and right sides of the fifth array antenna 1300*a*, respectively. The third and fourth array antennas 1100*a*, 1100*b* of the first antenna structure 1000*a* may radiate a horizontally polarized signal. The seventh and eighth array antennas 1100*c*, 1100*d* of the second antenna structure 1000*b* may radiate a horizontally polarized signal.

On the other hand, when a wireless link on the LOS path is not formed due to an obstacle between the communication device 100 and the electronic device 200, it may be controlled to transmit and receive a wireless signal in the upper front direction instead of the front direction in FIG. 6. In this regard, a beam direction of the first or fifth array antenna 1200*a*, 1200*b* may be changed from a front direction to an upper front direction in a vertical direction.

The electronic device 200 may form a wireless link to reflect a wireless signal transmitted from the communication device 100 through a ceiling or wall surface. To this end, the electronic device 200 may form a beamforming wireless signal in a ceiling direction (upper direction). The first wireless communication IC 1400*a* may adjust the phase of a signal applied to the patch antennas PA21 to PA28 in a second row with respect to the patch antennas PA11 to PA18 in a first row of the first array antenna 1200*a* to control the beamforming wireless signal to face an upper front direction. Furthermore, the second wireless communication IC 1400*b* may adjust the phase of a signal applied to the patch antennas PA21 to PA28 in a second row with respect to the patch antennas PA11 to PA18 in a first row of the fifth array antenna 1200*b* to control the beamforming wireless signal to face an upper front direction.

Figure 10A:
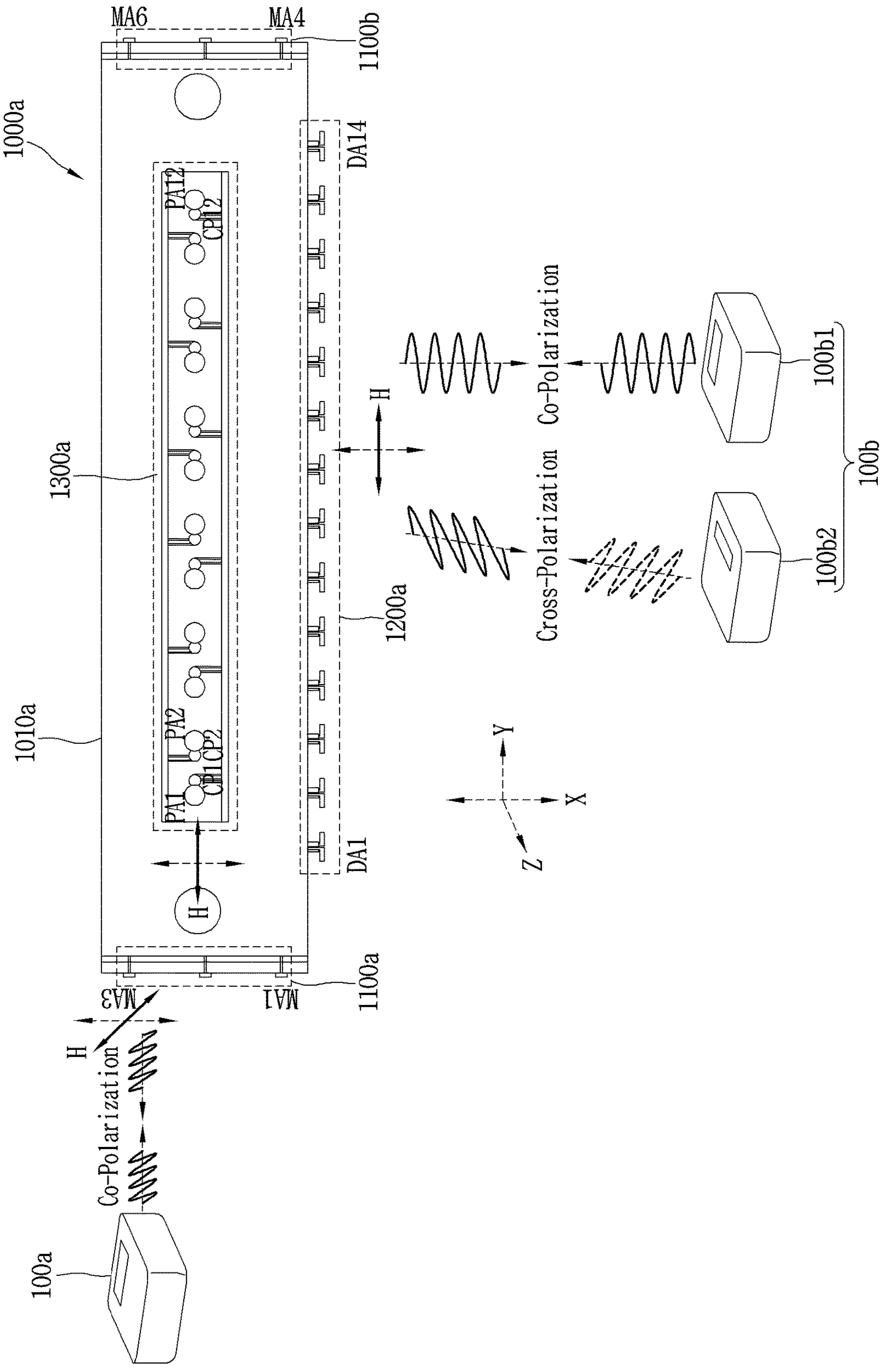
FIG. 10A shows a structure in which a first antenna structure provided with a plurality of antenna arrays, having the antenna disposition structure in (b) of FIG. 5, performs wireless communication with communication devices at various locations.
Figure 10B:
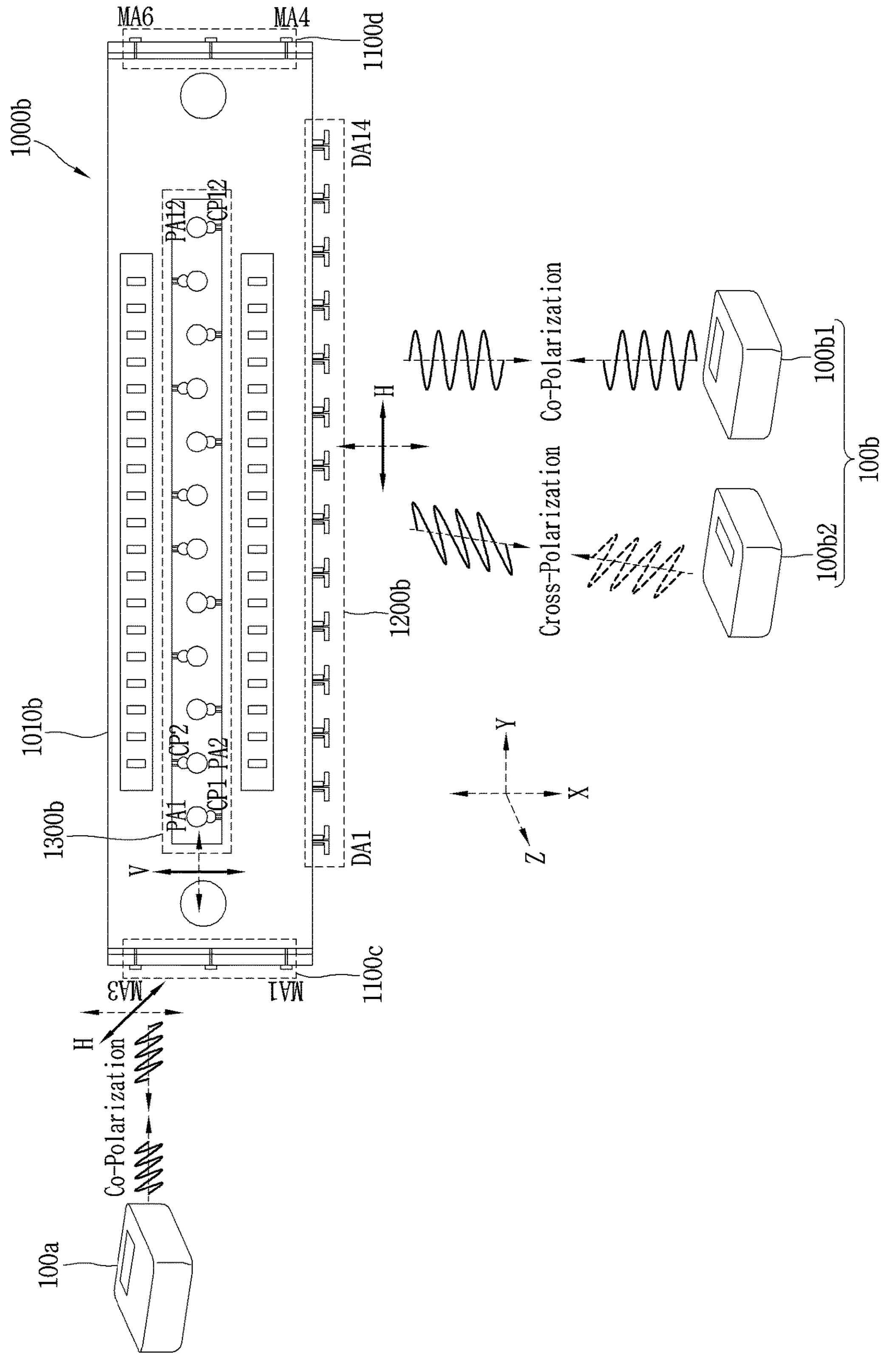
FIG. 10B shows a structure in which a second antenna structure provided with a plurality of antenna arrays, having the antenna disposition structure in (b) of FIG. 5, performs wireless communication with communication devices at various locations.

Meanwhile, in the first and second antenna structures disposed in the electronic device according to the present disclosure, a plurality of array antennas may be disposed in different regions of the PCB. In this regard, FIG. 10A shows a structure in which a first antenna structure provided with a plurality of antenna arrays, having the antenna disposition structure in (b) of FIG. 5, performs wireless communication with communication devices at various locations. FIG. 10B shows a structure in which a second antenna structure provided with a plurality of antenna arrays, having the antenna disposition structure in (b) of FIG. 5, performs wireless communication with communication devices at various locations.

Referring to (b) of FIG. 5, and FIGS. 7A, 8C, and 10A, the first antenna structure 1000*a* may include a first array antenna 1200*a*, a second array antenna 1300*a*, a third array antenna 1100*a*, and a fourth array antenna 1100*b*.

The first array antenna 1200*a* may include a plurality of monopole antennas DA1 to DA14 disposed in a front side region of the first PCB 1010*a*. The first array antenna 1200*a* may be implemented with 14 1×14 array antennas, but is not limited thereto.

The first array antenna 1200*a* may transmit and receive a horizontally polarized signal to and from a front region. The first array antenna 1200*a* may transmit a horizontally polarized signal to the communication device disposed in a front region and receive the horizontally polarized signal therefrom. The communication device and the first array antenna 1200*a* may transmit and receive a wireless signal having co-polarization.

The second array antenna 1300*a* may include a plurality of patch antennas PA1 to PA12 disposed in a bottom region of the first PCB 1010*a*. Coupling patches CP1 to CP12 may be disposed at positions offset from the center of the patch antennas PA1 to PA12 in right and left directions in the Y-axis direction, which is a horizontal direction. A signal may be transmitted and received. The second array antenna 1300*a* may be implemented with 12 1×12 array antennas, but is not limited thereto.

The second array antenna 1300*a* may transmit and receive a horizontally polarized signal to and from a bottom region. The second array antenna 1300*a* may transmit a horizontally polarized signal to the communication device 100*b* disposed in a bottom region and receive the horizontally polarized signal therefrom. The communication device 100*b* and the second array antenna 1300*a* may transmit and receive a wireless signal having co-polarization.

The third array antenna 1100*a* may include a plurality of monopole antennas MA1 to MA3 disposed in one side region of the first PCB 1010*a*. The fourth array antenna 1100*b* may include a plurality of monopole antennas MA4 to MA6 disposed in the other side region of the third PCB 1010*c*. The third array antenna 1100*a* may be implemented with a 1×3 array antenna in one side region of the first PCB 1010*a*, but is not limited thereto. The fourth array antenna 1100*b* may be implemented with a 1×3 array antenna in the other side region of the first PCB 1010*a*, but is not limited thereto.

The third and fourth array antennas 1100*a*, 1100*b* may transmit and receive a vertically polarized signal to one side region and the other side region. The third array antenna 1100*a* may transmit a horizontally polarized signal to the communication device 100*c* disposed in one side region and receive the horizontally polarized signal therefrom. The communication device 100*c* and the third array antenna 1100*a* may transmit and receive a wireless signal having co-polarization.

Referring to (b) of FIG. 5, and FIGS. 7A, 8D, and 10B, the second antenna structure 1000*b* may include a fifth array antenna 1200*b*, a sixth array antenna 1300*b*, a seventh array antenna 1100*c*, and an eighth array antenna 1100*d*.

The fifth array antenna 1200*b* may include a plurality of dipole antennas DA1 to DA14 disposed in a front region of the second PCB 1010*b*. The fifth array antenna 1200*b* may be implemented with 14 1×14 array antennas, but is not limited thereto.

The fifth array antenna 1200*b* may transmit and receive a horizontally polarized signal to and from a front region. The fifth array antenna 1200*d* may transmit a horizontally polarized signal to the communication device disposed in a front region and receive the horizontally polarized signal therefrom. The communication device and the fifth array antenna 1200*b* may transmit and receive a wireless signal having co-polarization.

The sixth array antenna 1300*b* may include a plurality of patch antennas PA1 to PA12. Coupling patches CP1 to CP12 may be disposed at positions offset from the center of the patch antennas PA1 to PA12 in top and bottom directions in the Z-axis direction, which is a vertical direction. The sixth array antenna 1300*b* may be implemented with 12 1×12 array antennas, but is not limited thereto.

The sixth array antenna 1300*b* may transmit and receive a vertically polarized signal to and from a bottom region. The sixth array antenna 1300*b* may transmit a vertically polarized signal to the communication device 100*b* disposed in a bottom region and receive the vertically polarized signal therefrom. The communication device 100*b* and the sixth array antenna 1300*b* may transmit and receive a wireless signal having co-polarization.

The seventh array antenna 1100*c* may include a plurality of monopole antennas MA1 to MA3 disposed in one side region of the second PCB 1010*b*. The eighth array antenna 1100*d* may include a plurality of monopole antennas MA4 to MA6 disposed in the other side region of the second PCB 1010*b*. The seventh array antenna 1100*c* may be implemented with a 1×3 array antenna in one side region of the second PCB 1010*b*, but is not limited thereto. The eighth array antenna 1100*d* may be implemented with a 1×3 array antenna in the other side region of the second PCB 1010*b*, but is not limited thereto.

The seventh and eighth array antennas 1100*c* and 1100*d* may transmit and receive a vertically polarized signal to one side region and the other side region. The seventh array antenna 1100*c* may transmit a horizontally polarized signal to the communication device 100*c* disposed in one side region and receive the horizontally polarized signal therefrom. The communication device 100*c* and the seventh array antenna 1100*c* may transmit and receive a wireless signal having co-polarization.

Figure 11A:
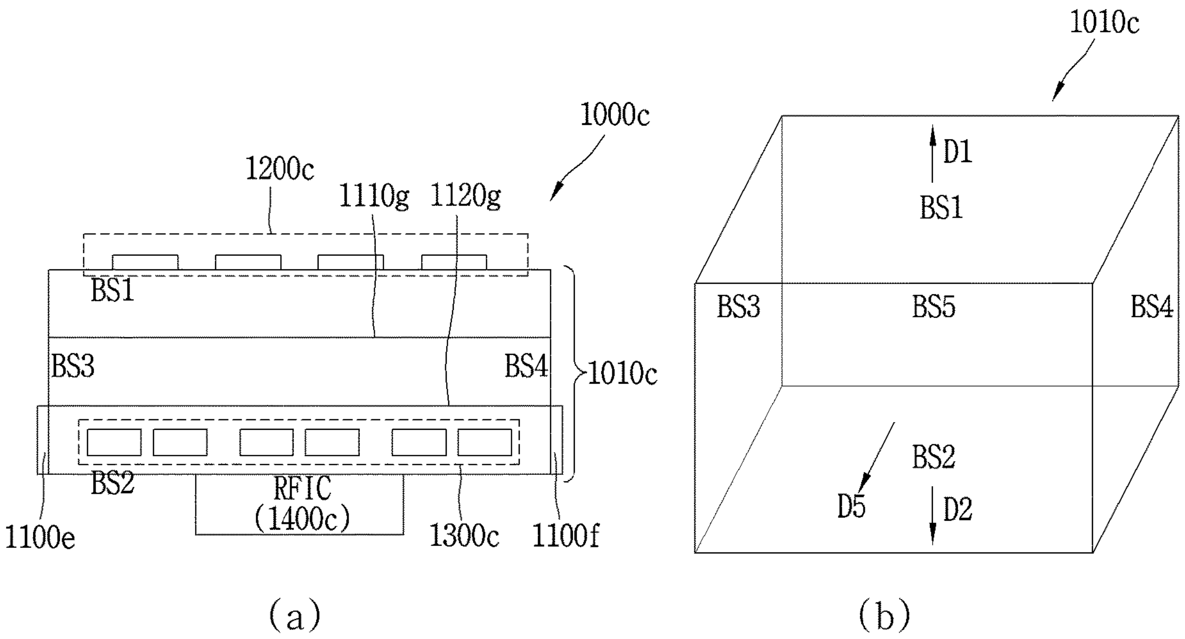
FIGS. 11A and 11B show cross-sectional views of third and fourth antenna structures provided with a plurality of antenna arrays, and implemented in third and fourth PCBs, having the antenna disposition structure in (a) of FIG. 5.
Figure 11B:
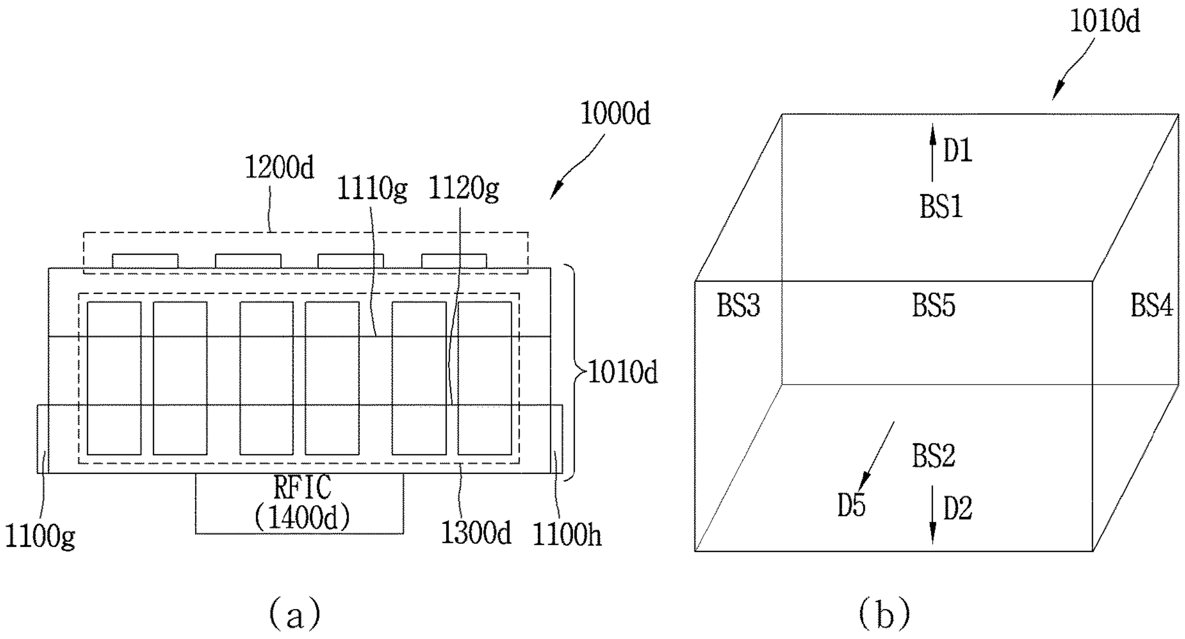
Figure 11C:
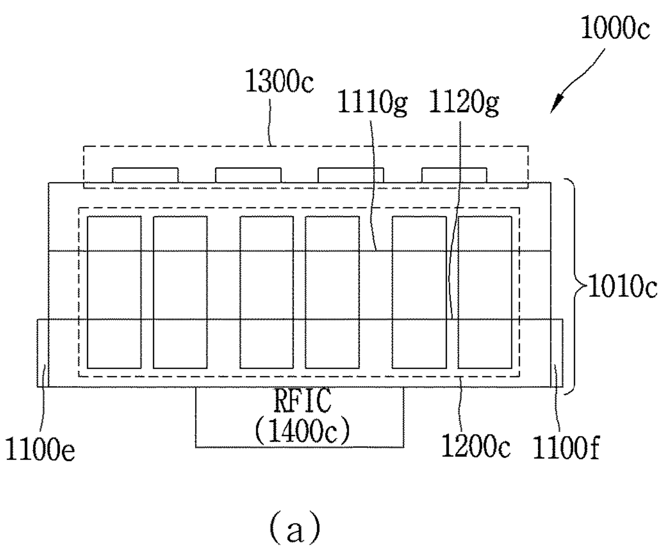
FIGS. 11C and 11D show cross-sectional views of third and fourth antenna structures provided with a plurality of antenna arrays, and implemented in third and fourth PCBs, having the antenna disposition structure in (b) of FIG. 5.
Figure 11C:
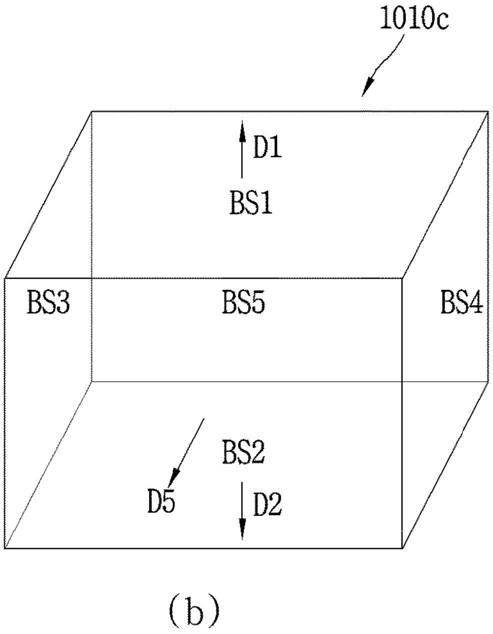
Figure 11D:
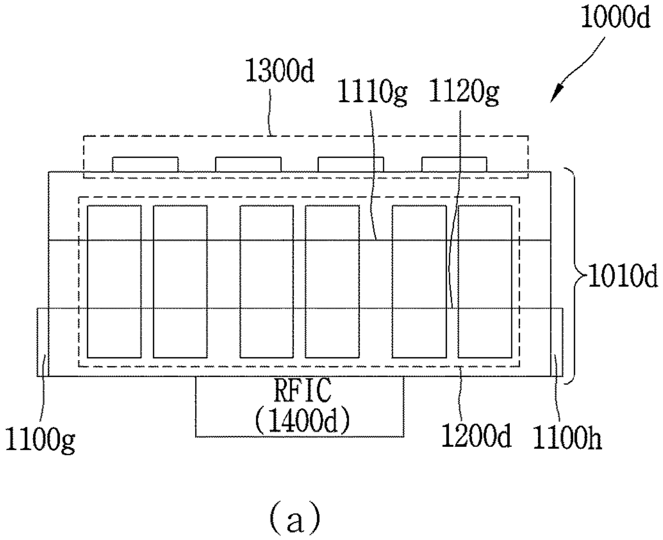
Figure 11D:
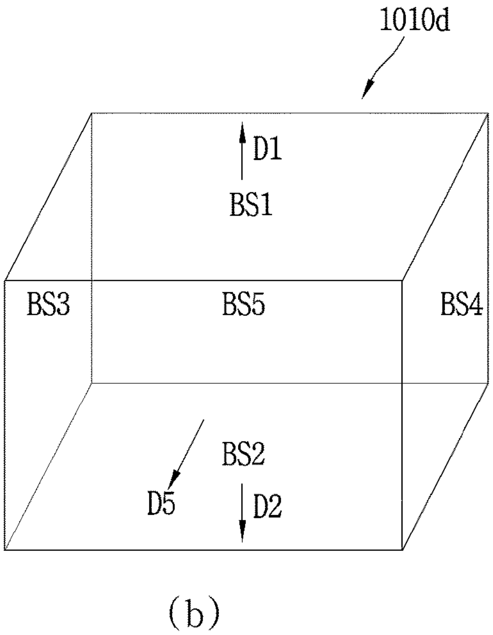

Meanwhile, the first and second antenna structures disposed in the electronic device may be configured with a multi-layer substrate structure. The first and second antenna structures may be implemented as a printed circuit board (PCB) structure. In this regard, FIGS. 11A and 11B show cross-sectional views of third and fourth antenna structures provided with a plurality of antenna arrays, and implemented in third and fourth PCBs, having the antenna disposition structure in (a) of FIG. 5. FIGS. 11C and 11D show cross-sectional views of third and fourth antenna structures provided with a plurality of antenna arrays, and implemented in third and fourth PCBs, having the antenna disposition structure in (b) of FIG. 5.

(a) of FIG. 11A shows a cross-sectional view of a third antenna structure 1000*c* disposed in the antenna disposition structure in (a) of FIG. 5 and implemented with a third PCB 1010*c*.

(b) of FIG. 11A shows a three-dimensional structure of a third PCB 1010*c* configured with a first surface BS1, 11*a* second surface BS2 to a fifth surface BS5.

(a) of FIG. 11B shows a cross-sectional view of a second antenna structure 1000*d* disposed in the antenna disposition structure in (a) of FIG. 5 and implemented with a fourth PCB 1010*d*. (b) of FIG. 11B shows a three-dimensional structure of the fourth PCB 1010*d* configured with a first surface BS1, and a second surface BS2 to a fifth surface BS5.

(a) of FIG. 11C shows a cross-sectional view of a third antenna structure 1000*c* disposed in the antenna disposition structure in (a) of FIG. 5 and implemented with a third PCB 1010*c*.

(b) of FIG. 11C shows a three-dimensional structure of the third PCB 1010*c* configured with a first surface BS1, and a second surface BS2 to a fifth surface BS5.

(a) of FIG. 11D shows a cross-sectional view of a second antenna structure 1000*d* disposed in the antenna disposition structure in (a) of FIG. 5 and implemented with a fourth PCB 1010*d*. (b) of FIG. 11D shows a three-dimensional structure of the fourth PCB 1010*d* configured with a first surface BS1, and a second surface BS2 to a fifth surface BS5.

In this regard, the third and fourth antenna structures of FIGS. 11A to 11D may correspond to the first and second antenna structures 1000*c*, 1000*d* of FIG. 7B. Accordingly, in the first and second antenna structures of FIGS. 11A to 11D, array antennas disposed on front and side surfaces operate as vertically polarized antennas, and array antennas disposed on lower surfaces operate as horizontally or vertically polarized antennas.

Referring to FIGS. 4 to 6, 7B, 11A, and 11C, the third antenna structure 1000*c* may include a third PCB 1010*c* constituting a multi-layer structure, a first array antenna 1200*c*, a second array antenna 1300*c*, and a first wireless communication IC 1400*c*. Furthermore, the third antenna structure 1000*c* may further include a third array antenna 1100*e* and a fourth array antenna 1100*f* disposed on left and right side surfaces. A plurality of ground layers 1110*g*, 1120*g* may be disposed inside the third PCB 1010*c* to maintain interference between signals of the plurality of array antennas at a predetermined level or less.

The third PCB 1010*c* may constitute a plurality of side surfaces. The third PCB 1010*c* may include first to fifth surfaces BS1 to BS5. A first surface BS1 of the plurality of side surfaces may be configured to face the front direction D1 of the electronic device 200, and a second surface BS2 of the plurality of side surfaces to face the rear direction D2 of the electronic device 200. A third surface BS3 of the plurality of side surfaces may be configured to face a left direction of the electronic device 200, and a fourth surface BS4 of the plurality of side surfaces to face a right direction of the electronic device 200. A fifth surface BS5 of the plurality of side surfaces may be configured to face a bottom direction D3 of the electronic device 200.

The first surface BS1 may be configured to face a first direction (front direction) D1. The second surface BS2 may be configured to face a second direction (rear direction) D2 opposite to the first direction D1. The third to fifth surfaces BS3 to BS5 may be configured to surround a space between the first and second surfaces BS1, BS2.

The first array antenna 1200*c* may be disposed on the first surface BS1 between the third and fourth surfaces BS3, BS4. The second array antenna 1300*c* may be disposed on the fifth surface BS5 between the third and fourth surfaces BS3, BS4. The first array antenna 1200*c* may form a beam pattern in the first direction D1. The second array antenna 1300*c* may form a beam pattern in the fifth direction D5. The first wireless communication IC 1400*a* may be disposed on the second surface BS2. The first wireless communication IC 1400*c* may transmit or receive a wireless signal in a first frequency range.

Referring to FIGS. 4 to 6, 7B, 11B, and 11D, the fourth antenna structure 1000*d* constituting a multi-layer structure may include a fourth PCB 1010*d*, a fifth array antenna 1200*d*, a sixth array antenna 1300*d*, and a second wireless communication IC 1400*d*. Furthermore, the fourth antenna structure 1000*d* may further include a seventh array antenna 1100*g* and an eighth array antenna 1100*h* disposed on left and right side surfaces. A plurality of ground layers 1110*g*, 1120*g* may be disposed inside the fourth PCB 1010*d* to maintain interference between signals of the plurality of array antennas at a predetermined level or less.

The fourth PCB 1010*d* may constitute a plurality of side surfaces. The fourth PCB 1010*d* may include first to fifth surfaces BS1 to BS5. A first surface BS1 of the plurality of side surfaces may be configured to face the front direction D1 of the electronic device 200, and a second surface BS2 of the plurality of side surfaces to face the rear direction D2 of the electronic device 200. A third surface BS3 of the plurality of side surfaces may be configured to face a left direction of the electronic device 200, and a fourth surface BS4 of the plurality of side surfaces to face a right direction of the electronic device 200. A fifth surface BS5 of the plurality of side surfaces may be configured to face a bottom direction D3 of the electronic device 200.

The first surface BS1 may be configured to face a first direction (front direction) D1. The second surface BS2 may be configured to face a second direction (rear direction) D2 opposite to the first direction D1. The third to fifth surfaces BS3 to BS5 may be configured to surround a space between the first and second surfaces BS1, BS2.

The fifth array antenna 1200*b* may be disposed on the first surface BS1 between the third and fourth surfaces BS3, BS4. The sixth array antenna 1300*d* may be disposed on the fifth surface BS5 between the third and fourth surfaces BS3, BS4. The fifth array antenna 1200*d* may form a beam pattern in the first direction D1. The sixth array antenna 1300*d* may form a beam pattern in the fifth direction D5. The second wireless communication IC 1400*d* may be disposed on the second surface BS2. The second wireless communication IC 1400*d* may transmit or receive a wireless signal in a first frequency range.

The polarization of the first array antenna 1200*c* may be the same as that of the fifth array antenna 1200*d*. The first array antenna 1200*c* may radiate a polarized signal that is polarized in the Z-axis direction to travel in the X-axis direction. The fifth array antenna 1200*d* may radiate a polarized signal that is polarized in the Y-axis direction to travel in the X-axis direction.

A signal traveling in the X-axis direction, which is a front direction, corresponds to a horizontally polarized signal when polarized in the Y-axis direction, and corresponds to a vertically polarized signal when polarized in the Z-axis direction. Accordingly, the first array antenna 1200*c* may radiate a vertically polarized signal in the Z-axis direction, and the fifth array antenna 1200*d* may radiate a horizontally polarized signal in the Y-axis direction. The horizontally polarized signal is a signal in which an electric field is formed in the Y-axis direction corresponding to a length of the third antenna structure 1000*c*, and the vertically polarized signal is a signal in which an electric field is formed in the Z-axis direction corresponding to a width of the third antenna structure 1000*c*.

The polarization of the third array antenna 1100*e* may be the same as that of the fourth array antenna 1100*f*. The third array antenna 1100*e* may radiate a polarized signal that is polarized in the Z-axis direction to travel in a left Y-axis direction. The fourth array antenna 1100*f* may radiate a polarized signal that is polarized in the Z-axis direction to travel in a right Y-axis direction.

A signal traveling in the Y-axis direction, which is a lateral direction, corresponds to a vertically polarized signal when polarized in the Z-axis direction, and corresponds to a vertically polarized signal when polarized in the Z-axis direction. Accordingly, the third array antenna 1100*e* and the fourth array antenna 1100*f* may radiate a vertically polarized signal in the Z-axis direction.

The polarization of the second array antenna 1300*c* may be different from that of the sixth array antenna 1300*d*. The polarization of the second array antenna 1300*c* may be orthogonal to that of the sixth array antenna 1300*d*. The second array antenna 1300*c* may radiate a polarized signal that is polarized in the Y-axis direction to travel in a lower Z-axis direction. The sixth array antenna 1300*d* may radiate a polarized signal that is polarized in the X-axis direction to travel in a lower Z-axis direction.

A signal traveling in the Z-axis direction corresponds to a horizontally polarized signal when polarized in the Y-axis direction, and corresponds to a vertically polarized signal when polarized in the X-axis direction. Accordingly, the second array antenna 1300*c* may radiate a horizontally polarized signal in the Y-axis direction. The sixth array antenna 1300*d* may radiate a vertically polarized signal in the X-axis direction. As another example, the second array antenna 1300*c* may radiate a vertically polarized signal, and the sixth array antenna 1300*d* may radiate a horizontally polarized signal.

The polarization of the seventh array antenna 1100*a* may be the same as that of the eighth array antenna 1100*h*. The seventh array antenna 1100*g* may radiate a polarized signal that is polarized in the Z-axis direction to travel in a left Y-axis direction. The eighth array antenna 1100*h* may radiate a polarized signal that is polarized in the Z-axis direction to travel in a right Y-axis direction. Accordingly, the seventh array antenna 1100*g* and the eighth array antenna 1100*h* may radiate a vertically polarized signal in the Z-axis direction.

The communication device 100 that transmits and receives a wireless signal to and from the electronic device 200 may radiate a horizontally polarized signal. When the communication device 100 is located in a front or side region of the electronic device 200, both the third and fourth antenna structures 1000*c*, 1000*d* may operate. Meanwhile, when the communication device 100 is located in a bottom region of the electronic device 200, either one of the third and fourth antenna structures 1000*c*, 1000*d* may operate.

When the communication device 100 is located in a front region of the electronic device 200, all the array antennas 1200*c*, 1200*d* located on front sides of the third and fourth antenna structures 1000*c*, 1000*d*, respectively, which are operable with co-polarization, operate to communicate simultaneously. The co-polarization may be either one of horizontal polarization or vertical polarization on a bottom surface in a front communication region.

When located in a left side region of the electronic device 200, the communication device 100 simultaneously communicates with antennas located at left side portions of the third and fourth antenna structures 1000*c*, 1000*d*, respectively, which are operable with co-polarization. The co-polarization may be either one of horizontal polarization or vertical polarization on a bottom surface in a lateral communication region.

When located in a right side region of the electronic device 200, the communication device 100 simultaneously communicates with antennas located at right side portions of the third and fourth antenna structures 1000*c*, 1000*d*, respectively, which are operable with co-polarization. The co-polarization may be either one of horizontal polarization or vertical polarization on a bottom surface in a lateral communication region.

Therefore, when the communication device 100 is located in one of left and right side regions of the electronic device 200, all the array antennas located on the corresponding side surfaces of the third and fourth antenna structures 1000*c*, 1000*d* may operate. Meanwhile, when the communication device 100 is located in a bottom region of the electronic device 200, either one of the array antennas 1300*c*, 1300*d* located on lower surfaces of the third and fourth antenna structures 1000*c*, 1000*d* operates.

In this regard, when the communication device 100 is located in a bottom region of the electronic device 200, the communication device 100 may operate with either one of the third and fourth antenna structures 1000*c*, 1000*d*, which are operable with different polarizations. When the communication device 100 is located to provide polarization in parallel to a wall surface, the third antenna structure 1000*c* may provide the same polarization. In this case, the antenna of the communication device 100 communicates with the third antenna structure 1000*c* of the electronic device 200. The communication device 100 is unable to communicate with the fourth antenna structure 1000*d* of the electronic device 200.

When located in a bottom region of the electronic device 200, the communication device 100 may operate with either one of the third and fourth antenna structures 1000*c*, 1000*d*, which are operable with different polarizations. When the communication device 100 is located to provide polarization perpendicular a wall surface, the fourth antenna structure 1000*d* may provide the same polarization. In this case, the antenna of the communication device 100 communicates with the fourth antenna structure 1000*d* of the electronic device 200. The communication device 100 is unable to communicate with the third antenna structure 1000*c* of the electronic device 200.

When the communication device 100 is located in a front region, patch array antennas on front sides of the third and fourth antenna structures 1000*c*, 1000*d*, respectively, may radiate polarized signals capable of communicating with the communication device 100. The polarized signal may be either horizontally polarized or vertically polarized.

When the communication device 100 is located in a side region, antennas on one side surface the side array antennas of the third and fourth antenna structures 1000*c*, 1000*d*, respectively, may radiate polarized signals capable of communicating with the communication device 100. The polarized signal may be either horizontally polarized or vertically polarized.

When the communication device 100 is located in a bottom region, the first wireless communication IC 1400*c* may control a horizontally polarized signal to be received and transmitted through the second array antenna 1300*c* of the third antenna structure 1000*c*.

The communication device 100 may be located in the bottom region, and the second wireless communication IC 1400*d* may receive or transmit a vertically polarized signal through the sixth array antenna 1300*d* of the fourth antenna structure 1000*d*.

Meanwhile, in the first and second antenna structures disposed in the electronic device according to the present disclosure, a plurality of array antennas may be disposed in different regions of the PCB. In this regard, FIG. 12A shows a structure in which a third antenna structure provided with a plurality of antenna arrays, having the antenna disposition structure in (a) of FIG. 5, performs wireless communication with communication devices at various locations.

Figure 12A:
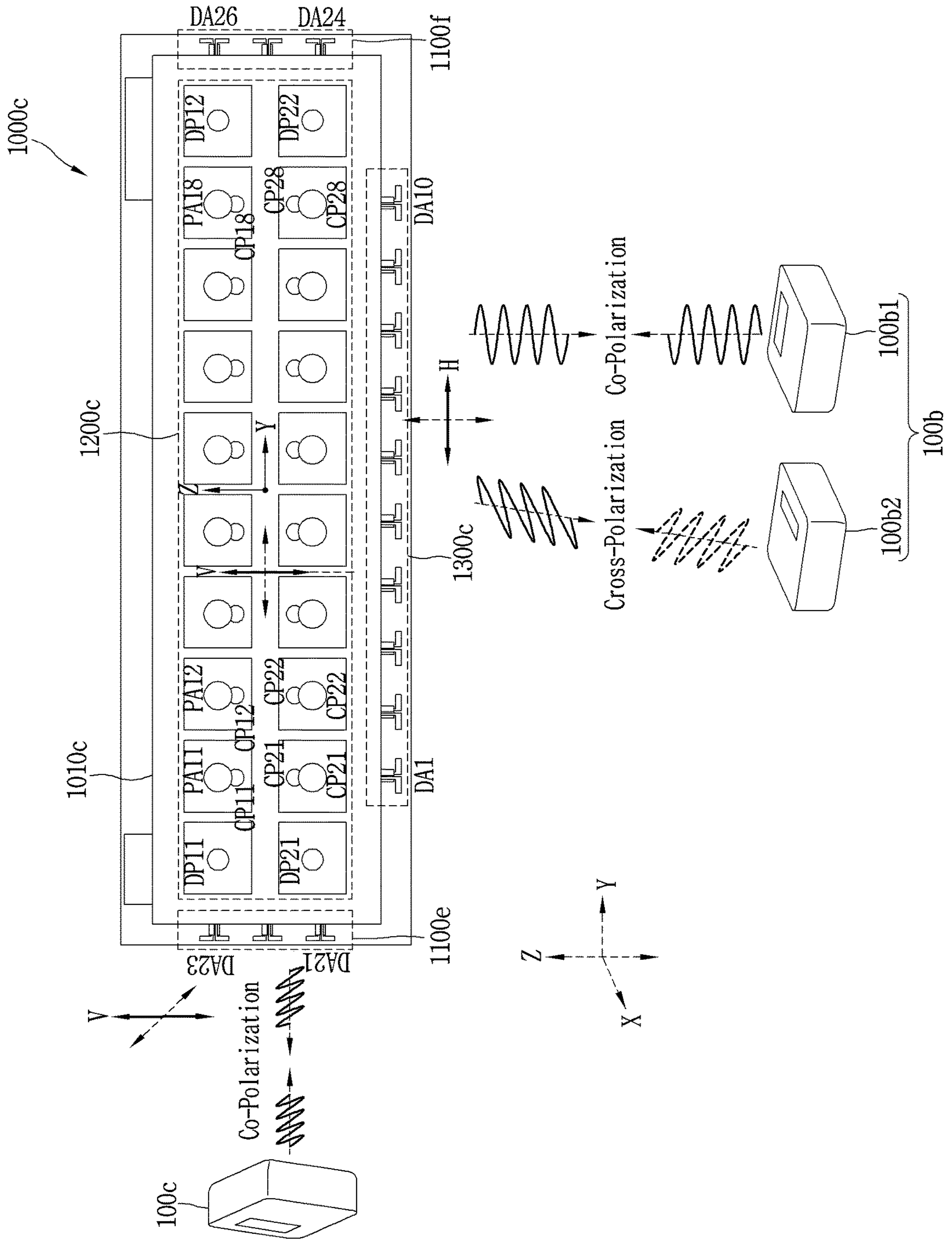
FIG. 12A shows a structure in which a third antenna structure provided with a plurality of antenna arrays, having the antenna disposition structure in (a) of FIG. 5, performs wireless communication with communication devices at various locations.

Referring to (a) of FIG. 5, and FIGS. 7B, and 12A, the third antenna structure 1000*c* may include a first array antenna 1200*c*, a second array antenna 1300*c*, a third array antenna 1100*e*, and a fourth array antenna 1100*f*.

The communication device 100*a* may be disposed in one side region of the third antenna structure 1000*c*. The communication device 100*a* may have an array antenna that transmits and receives a horizontally polarized signal.

The array antenna of the communication device 100*a* may be implemented with 16 or 32 antenna elements. A sum of the number of elements of the array antenna of the communication device 100*a* may be equal to a sum of the number of elements of the array antennas of the third antenna structure 1000*c* or the fourth antenna structure 1000*d*.

The number of elements of the array antenna of the communication device 100*a* may be equal to a sum of the number of elements of the first array antenna 1200*c* of the third antenna structure 1000*c* and the number of elements of the fifth array antenna 1200*d* of the fourth antenna structure 1000*d*. The number of elements of the array antenna of the communication device 100*a* may be larger than a sum of the number of elements of the second array antenna 1300*c* of the third antenna structure 1000*c* and the number of elements of the sixth array antenna 1300*d* of the fourth antenna structure 1000*d*.

The communication device 100*b* may be disposed in a bottom region of the third antenna structure 1000*c*. The communication device 100*b* may include an array antenna that transmits and receives a horizontally polarized signal. The array antenna of the communication device 100*b* may be implemented with 16 or 32 antenna elements.

The third array antenna 1100*e* may include a plurality of dipole antennas DA21 to DA23 disposed in one side region of the third PCB 1010*c*. The fourth array antenna 1100*f* may include a plurality of dipole antennas DA24 to DA26 disposed in the other side region of the third PCB 1010*c*.

The third array antenna 1100*e* may be implemented with a 1×3 array antenna in one side region of the third PCB 1010*c*, but is not limited thereto. The fourth array antenna 1100*f* may be implemented with a 1×3 array antenna on the other side of the first PCB 1010*a*, but is not limited thereto.

The third and fourth array antennas 1100*e*, 1100*f* may transmit and receive a horizontally polarized signal to one side region and the other side region. The third array antenna 1100*e* may transmit a horizontally polarized signal to the communication device 100*a* disposed in one side region and receive the horizontally polarized signal therefrom. The communication device 100*a* and the third array antenna 1100*a* may transmit and receive a wireless signal having co-polarization.

The first array antenna 1200*c* may include a plurality of patch antennas PA11 to PA18, PA21 to PA28 disposed in a front region of the third PCB 1010*c*. Coupling patches CP11 to CP18, CP21 to CP28 may be disposed at positions offset from the center of the patch antennas PA11 to PA18, PA21 to PA28 in top and bottom directions in the Z-axis direction, which is a vertical direction. Dummy pads DP11, DP21 may be disposed on one side of the patch antennas PAIL P21 to suppress side surface radiation. Dummy patch antennas DP12, DP22 may be disposed on the other side of the patch antennas PA11, P21 to suppress lateral radiation. The first array antenna 1200*c* may be implemented with 16 2×8 array antennas, but is not limited thereto.

The first array antenna 1200*c* may transmit and receive a vertically polarized signal to and from a front region. The first array antenna 1200*c* may transmit a horizontally polarized signal to the communication device disposed in a front region and receive the vertically polarized signal therefrom. The communication device and the first array antenna 1200*c* may transmit and receive a wireless signal having co-polarization.

The second array antenna 1300*c*, which is a bottom antenna of the third antenna structure 1000*c*, may include a plurality of dipole antennas DA1 to DA10 disposed in a bottom region of the first PCB. The second array antenna 1300*c* may be implemented with 10 1×10 array antennas, but is not limited thereto.

The second array antenna 1300*c* may transmit and receive a horizontally polarized signal to and from a bottom region. The second array antenna 1300*c* may transmit a horizontally polarized signal to the communication device 100*b* disposed in a bottom region and receive the horizontally polarized signal therefrom. The communication device 100*a* and the second array antenna 1300*c* may transmit and receive a wireless signal having co-polarization.

The communication device 100*b* may be disposed in a rotation state at an arbitrary angle. The communication device 100*b*1 in a first rotation state and the second array antenna 1300*c* may transmit and receive a horizontally polarized signal having co-polarization. Meanwhile, the communication device 100*b*2 in a second rotation state may be located in a state in which a polarized signal of the electronic device 200 is not transmitted or received. The second rotation state is a state rotated within a predetermined angle range based on 90 degrees with respect to the first rotation state. A vertically polarized signal of the communication device 100*b*2 in the second rotation state and a horizontally polarized signal of the second array antenna 1300*c* have an orthogonal cross-polarization. Therefore, wireless communication performance between the communication device 100*b* in the second rotation state and the third antenna structure 1000*c* may be reduced or communication may not be performed.

Figure 12B:
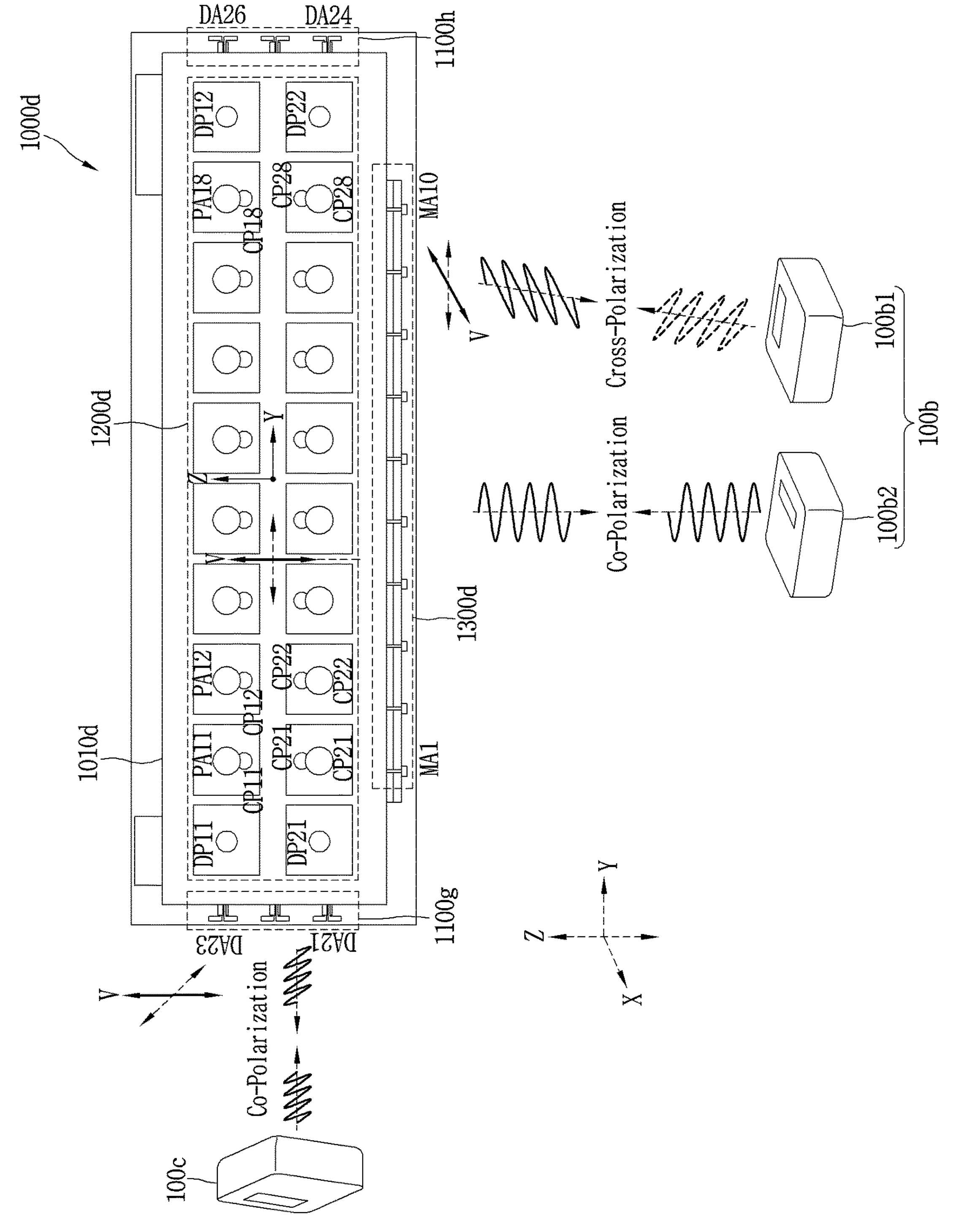
FIG. 12B shows a structure in which a fourth antenna structure provided with a plurality of antenna arrays, having the antenna disposition structure in (a) of FIG. 5, performs wireless communication with communication devices at various locations.

As a result, the sixth array antenna 1300*d*, which is a bottom antenna of the fourth antenna structure 1000*d*, may be configured to transmit and receive a vertically polarized signal to and from the communication device 100*b* in the second rotation state. In this regard, FIG. 12B shows a structure in which a fourth antenna structure provided with a plurality of antenna arrays, having the antenna disposition structure in (a) of FIG. 5, performs wireless communication with communication devices at various locations.

The communication device 100*a* may be disposed in a region in one side region of the fourth antenna structure 1000*d*. The communication device 100*a* may have an array antenna that transmits and receives a horizontally polarized signal. The array antenna of the communication device 100*a* may be implemented with 16 or 32 antenna elements.

The communication device 100*b* may be disposed in a bottom region of the electronic device 200. The communication device 100*b* may include an array antenna that transmits and receives a horizontally polarized signal. The array antenna of the communication device 100*b* may be implemented with 16 or 32 antenna elements.

The third array antenna 1100*e* may include a plurality of monopole antennas MA1 to MA3 disposed in one side region of the first PCB 1010*a*. The fourth array antenna 1100*f* may include a plurality of monopole antennas MA4 to MA6 disposed in the other side region of the first PCB 1010*a*.

The third array antenna 1100*e* may be implemented with a 1×3 array antenna in one side region of the first PCB, but is not limited thereto. The fourth array antenna 1100*f* may be implemented with a 1×3 array antenna in the other side region of the first PCB, but is not limited thereto.

The third and fourth array antennas 1100*e*, 1100*f* may transmit and receive a vertically polarized signal to one side region and the other side region. The third array antenna 1100*e* may transmit a vertically polarized signal to the communication device 100*a* disposed in one side region and receive the vertically polarized signal therefrom. The communication device 100*a* and the third array antenna 1100*e* may transmit and receive a wireless signal having co-polarization.

Referring to (a) of FIG. 5, and FIGS. 7B, and 12B, the fourth antenna structure 1000*d* may include a fifth array antenna 1200*d*, a sixth array antenna 1300*d*, a seventh array antenna 1100*g*, and an eighth array antenna 1100*h*.

The fifth array antenna 1200*d* may include a plurality of patch antennas PA11 to PA18, PA21 to PA28 disposed in a front region of the second PCB. Coupling patches CP11 to CP18, CP21 to CP28 may be disposed at positions offset from the center of the patch antennas PA11 to PA18, PA21 to PA28 in top and bottom directions in the Z-axis direction, which is a vertical direction. Dummy pads DP11, DP21 may be disposed on one side of the patch antennas PA11, P21 to suppress side surface radiation. Dummy patch antennas DP12, DP22 may be disposed on the other side of the patch antennas PA11, P21 to suppress lateral radiation. The first array antenna 1200*a* may be implemented with 16 2×8 array antennas, but is not limited thereto.

The fifth array antenna 1200*d* may transmit and receive a vertically polarized signal to and from a front region. The fifth array antenna 1200*d* may transmit a vertically polarized signal to the communication device disposed in a front region and receive the vertically polarized signal therefrom. The communication device and the fifth array antenna 1200*d* may transmit and receive a wireless signal having co-polarization.

The sixth array antenna 1300*d* may include a plurality of monopole antennas MA1 to MA10 disposed in a bottom region of the second PCB. The sixth array antenna 1300*d* may be implemented with 10 1×10 array antennas, but is not limited thereto.

The sixth array antenna 1300*d* may transmit and receive a horizontally polarized signal to and from a bottom region. The sixth array antenna 1300*d* may transmit a horizontally polarized signal to the communication device 100*b* disposed in a bottom region and receive the horizontally polarized signal therefrom. The communication device 100*a* and the sixth array antenna 1300*d* may transmit and receive a wireless signal having co-polarization.

The respective antennas of the third and fourth antenna structures 1000*c*, 1000*d* may be implemented with array antennas having the same structure or different structures. The first array antenna 1200*c* of the third antenna structure 1000*c* and the fifth array antenna 1300*c* of the fourth antenna structure 1000*d* may be implemented with array antennas having the same structure. The first array antenna 1200*c* of the third antenna structure 1000*c* is a 2×8 array patch antenna, and the fifth array antenna 1300*c* of the fourth antenna structure 1000*d* is a 2×8 array patch antenna. A feed location of the patch antenna may be disposed at a location biased to one side from a vertical central axis corresponding to the Z-axis.

The second array antenna 1300*c* of the third antenna structure 1000*c* and the sixth array antenna 1300*d* of the second antenna structure 1000*d* may be implemented with array antennas having different structures. The second array antenna 1300*a* of the first antenna structure 1000*a* may be a 1×10 array dipole antenna, and the sixth array antenna 1300*a* may be a 1×10 array monopole antenna. The polarization characteristics of the second array antenna 1300*a* and the sixth array antenna 1300*b* may be implemented to have a difference of 90 degrees.

The communication device 100*b* may be disposed in a rotation state at an arbitrary angle. The horizontally polarized signal of the communication device 100*b*1 in a first rotation state and the vertical polarized signal of the sixth array antenna 1300*d* have an orthogonal cross-polarization.

Meanwhile, the communication device 100*b*2 in a second rotation state may transmit and receive a vertically polarized signal. The second rotation state is a state rotated within a predetermined angle range based on 90 degrees with respect to the first rotation state. The vertically polarized signal of the communication device 100*b*2 in the second rotation state and the vertically polarized signal of the sixth array antenna 1300*d* have the same polarization (co-polarization). Accordingly, wireless communication performance between the communication device 100*b* in the second rotation state and the fourth antenna structure 1000*d* may be improved.

The seventh array antenna 1100*c* may be implemented with a 1×3 array antenna in one side region of the second PCB 1010*c*, but is not limited thereto. The eighth array antenna 1100*d* may be implemented with a 1×3 array antenna in the other side region of the second PCB, but is not limited thereto.

The seventh and eighth array antennas 1100*g*, 1100*h* may transmit and receive a horizontally polarized signal to one side region and the other side region. The seventh array antenna 1100*g* may transmit a vertically polarized signal to the communication device 100*a* disposed in one side region and receive the vertically polarized signal therefrom. The communication device 100*a* and the seventh array antenna 1100*g* may transmit and receive a wireless signal having co-polarization.

The array antennas disposed on side surfaces of the third and fourth antenna structures 1000*c*, 1000*d* may receive a signal from or transmit a signal to the communication device disposed on side surfaces of the electronic device. In this regard, the third antenna structure 1000*c* may further include third and fourth array antennas 1100*e*, 1100*f*, which are monopole antennas in a 1×3 array, on left and right sides of the first array antenna 1200*c*, respectively. The second antenna structure 1000*d* may further include seventh and eighth array antennas 1100*g*, 1100*h*, which are monopole antennas in a 1×3 array, on left and right sides of the fifth array antenna 1200*d*, respectively. The third and fourth array antennas 1100*e*, 1100*f* of the third antenna structure 1000*c* may radiate a horizontally polarized signal. The seventh and eighth array antennas 1100*g*, 1100*h* of the fourth antenna structure 1000*d* may radiate a vertically polarized signal.

On the other hand, when a wireless link on the LOS path is not formed due to an obstacle between the communication device 100 and the electronic device 200, it may be controlled to transmit and receive a wireless signal in the upper front direction instead of the front direction in FIG. 6. In this regard, a beam direction of the first or fifth array antenna 1200*c*, 1200*d* may be changed from a front direction to an upper front direction in a vertical direction.

The electronic device 200 may form a wireless link to reflect a wireless signal transmitted from the communication device 100 through a ceiling or wall surface. To this end, the electronic device 200 may form a beamforming wireless signal in a ceiling direction (upper direction). The first wireless communication IC 1400*c* may adjust the phase of a signal applied to the patch antennas PA21 to PA28 in a second row with respect to the patch antennas PA11 to PA18 in a first row of the first array antenna 1200*c* to control the beamforming wireless signal to face an upper front direction. Furthermore, the second wireless communication IC 1400*d* may adjust the phase of a signal applied to the patch antennas PA21 to PA28 in a second row with respect to the patch antennas PA11 to PA18 in a first row of the fifth array antenna 1200*d* to control the beamforming wireless signal to face an upper front direction.

Figure 13A:
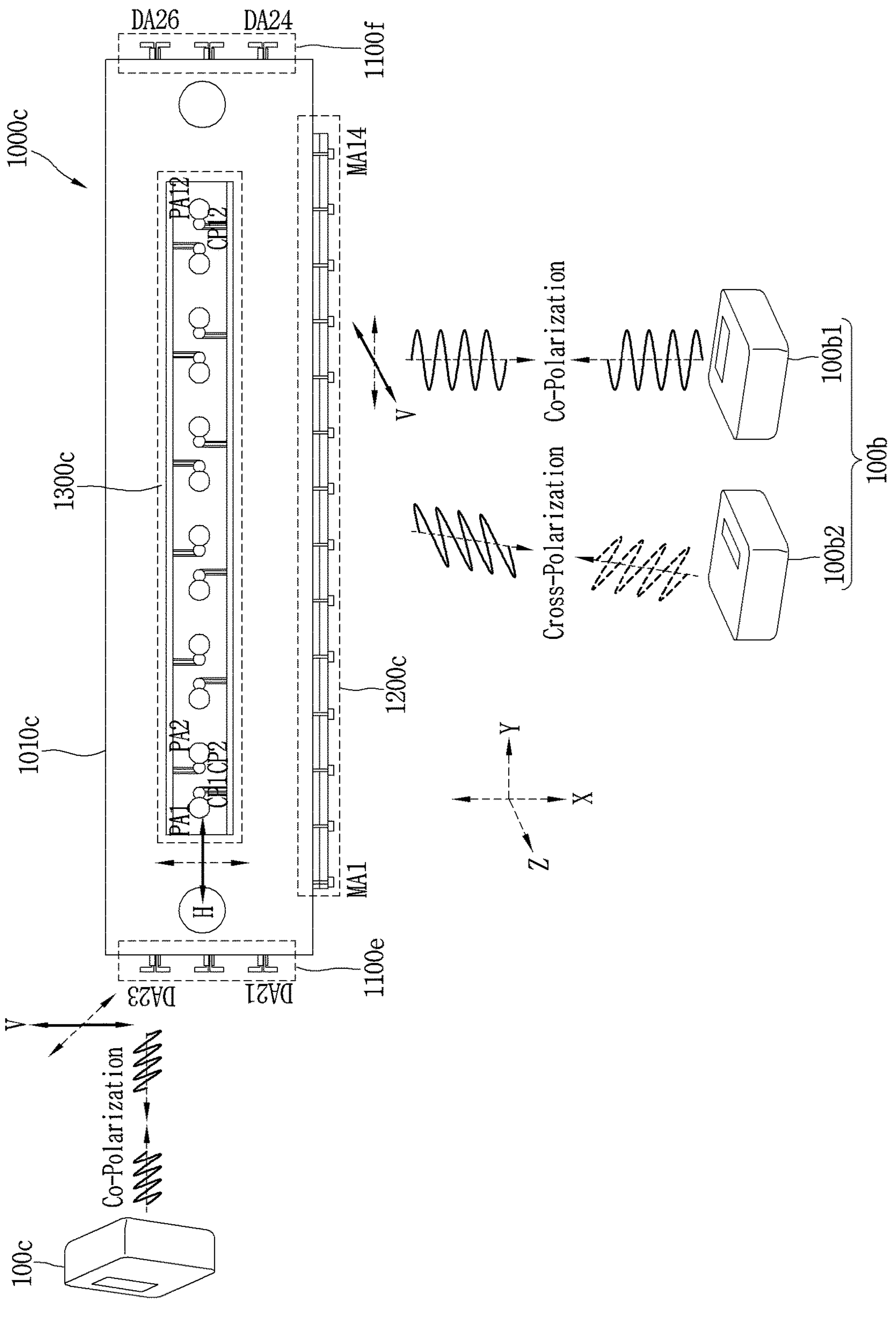
FIG. 13A shows a structure in which a third antenna structure provided with a plurality of antenna arrays, having the antenna disposition structure in (b) of FIG. 5, performs wireless communication with communication devices at various locations.
Figure 13B:
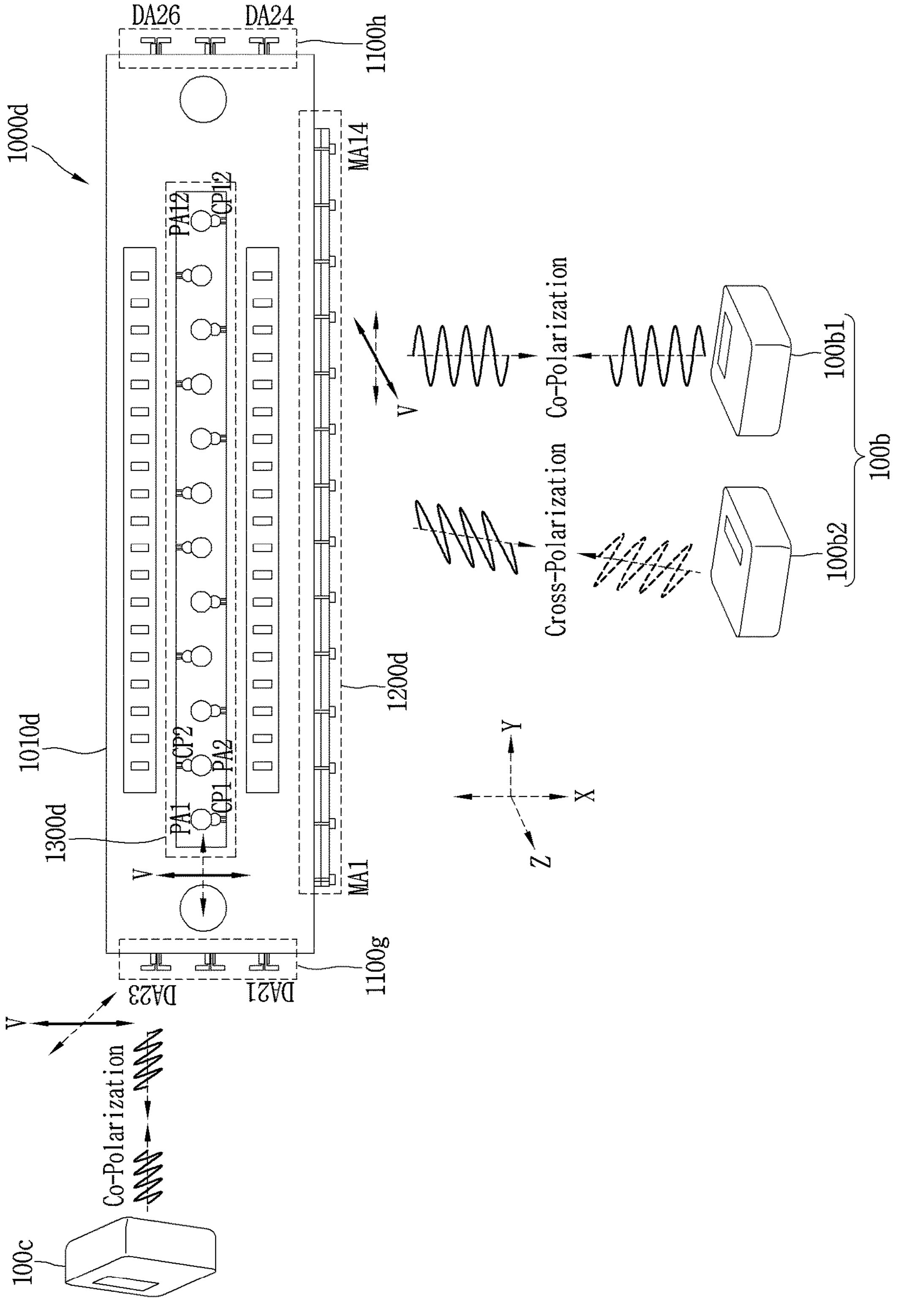
FIG. 13B shows a structure in which a fourth antenna structure provided with a plurality of antenna arrays, having the antenna disposition structure in (b) of FIG. 5, performs wireless communication with communication devices at various locations.

Meanwhile, in the first and second antenna structures disposed in the electronic device according to the present disclosure, a plurality of array antennas may be disposed in different regions of the PCB. In this regard, FIG. 13A shows a structure in which a third antenna structure provided with a plurality of antenna arrays, having the antenna disposition structure in (b) of FIG. 5, performs wireless communication with communication devices at various locations. FIG. 13B shows a structure in which a fourth antenna structure provided with a plurality of antenna arrays, having the antenna disposition structure in (b) of FIG. 5, performs wireless communication with communication devices at various locations.

Referring to (b) of FIG. 5, and FIGS. 7B, and 13A, the third antenna structure 1000*c* may include a first array antenna 1200*c*, a second array antenna 1300*c*, a third array antenna 1100*e*, and a fourth array antenna 1100*f*.

The first array antenna 1200*c* may include a plurality of monopole antennas MA1 to MA14 disposed in a front region of the third PCB 1010*c*. The first array antenna 1200*c* may be implemented with 14 1×14 array antennas, but is not limited thereto.

The first array antenna 1200*c* may transmit and receive a horizontally polarized signal to and from a front region. The first array antenna 1200*c* may transmit a vertically polarized signal to the communication device disposed in a front region and receive the vertically polarized signal therefrom. The communication device and the first array antenna 1200*c* may transmit and receive a wireless signal having co-polarization.

The second array antenna 1300*c* may include a plurality of patch antennas PA1 to PA12 disposed in a bottom region of the third PCB 1010*c*. Coupling patches CP1 to CP12 may be disposed at positions offset from the center of the patch antennas PA1 to PA12 in left and right directions in the Y-axis direction, which is a horizontal direction. The second array antenna 1300*c* may be implemented with 12 1×12 array antennas, but is not limited thereto.

The second array antenna 1300*c* may transmit and receive a horizontally polarized signal to and from a bottom region. The second array antenna 1300*c* may transmit a horizontally polarized signal to the communication device 100*b* disposed in a bottom region and receive the horizontally polarized signal therefrom. The communication device 100*b* and the second array antenna 1300*c* may transmit and receive a wireless signal having co-polarization.

The third array antenna 1100*e* may include a plurality of dipole antennas DA21 to DA23 disposed in one side region of the third PCB 1010*c*. The fourth array antenna 1100*f* may include a plurality of dipole antennas DA24 to DA26 disposed in the other side region of the third PCB 1010*c*. The third array antenna 1100*e* may be implemented with a 1×3 array antenna in one side region of the third PCB 1010*c*, but is not limited thereto. The fourth array antenna 1100*f* may be implemented with a 1×3 array antenna in the other side region of the third PCB 1010*c*, but is not limited thereto.

The third and fourth array antennas 1100*e*, 1100*f* may transmit and receive a vertically polarized signal to one side region and the other side region. The third array antenna 1100*e* may transmit a vertically polarized signal to the communication device 100*c* disposed in one side region and receive the vertically polarized signal therefrom. The communication device 100*c* and the third array antenna 1100*e* may transmit and receive a wireless signal having co-polarization.

Referring to (b) of FIG. 5, and FIGS. 7B, and 13B, the fourth antenna structure 1000*d* may include a fifth array antenna 1200*d*, a sixth array antenna 1300*d*, a seventh array antenna 1100*g*, and an eighth array antenna 1100*h*.

The fifth array antenna 1200*d* may include a plurality of monopole antennas MA1 to MA14 disposed in a front region of the fourth PCB 1010*d*. The fifth array antenna 1200*d* may be implemented with 14 1×14 array antennas, but is not limited thereto.

The fifth array antenna 1200*d* may transmit and receive a vertically polarized signal to and from a front region. The fifth array antenna 1200*d* may transmit a vertically polarized signal to the communication device disposed in a front region and receive the vertically polarized signal therefrom. The communication device and the fifth array antenna 1200*d* may transmit and receive a wireless signal having co-polarization.

The sixth array antenna 1300*d* may include a plurality of patch antennas PA1 to PA12. Coupling patches CP1 to CP12 may be disposed at positions offset from the center of the patch antennas PA1 to PA12 in top and bottom directions in the Z-axis direction, which is a vertical direction. The sixth array antenna 1300*d* may be implemented with 12 1×12 array antennas, but is not limited thereto.

The sixth array antenna 1300*d* may transmit and receive a vertically polarized signal to and from a bottom region. The sixth array antenna 1300*d* may transmit a vertically polarized signal to the communication device 100*b* disposed in a bottom region and receive the vertically polarized signal therefrom. The communication device 100*b* and the sixth array antenna 1300*d* may transmit and receive a wireless signal having co-polarization.

The seventh array antenna 1100*g* may include a plurality of dipole antennas DA21 to DA23 disposed in one side region of the fourth PCB 1010*d*. The eighth array antenna 1100*h* may include a plurality of dipole antennas DA24 to DA26 disposed in the other side region of the fourth PCB 1010*d*. The seventh array antenna 1100*g* may be implemented with a 1×3 array antenna in one side region of the fourth PCB 1010*d*, but is not limited thereto. The eighth array antenna 1100*d* may be implemented with a 1×3 array antenna in the other side region of the fourth PCB 1010*d*, but is not limited thereto.

The seventh and eighth array antennas 1100*a*, 1100*h* may transmit and receive a vertically polarized signal to one side region and the other side region. The seventh array antenna 1100*g* may transmit a vertically polarized signal to the communication device 100*c* disposed in one side region and receive the vertically polarized signal therefrom. The communication device 100*c* and the seventh array antenna 1100*g* may transmit and receive a wireless signal having co-polarization.

In the above, an electronic device having first and second antenna structures including a plurality of array antennas has been described. In this regard, a method of performing wireless communication between an electronic device and a communication device will be described in detail with reference to the drawings.

Figure 14:
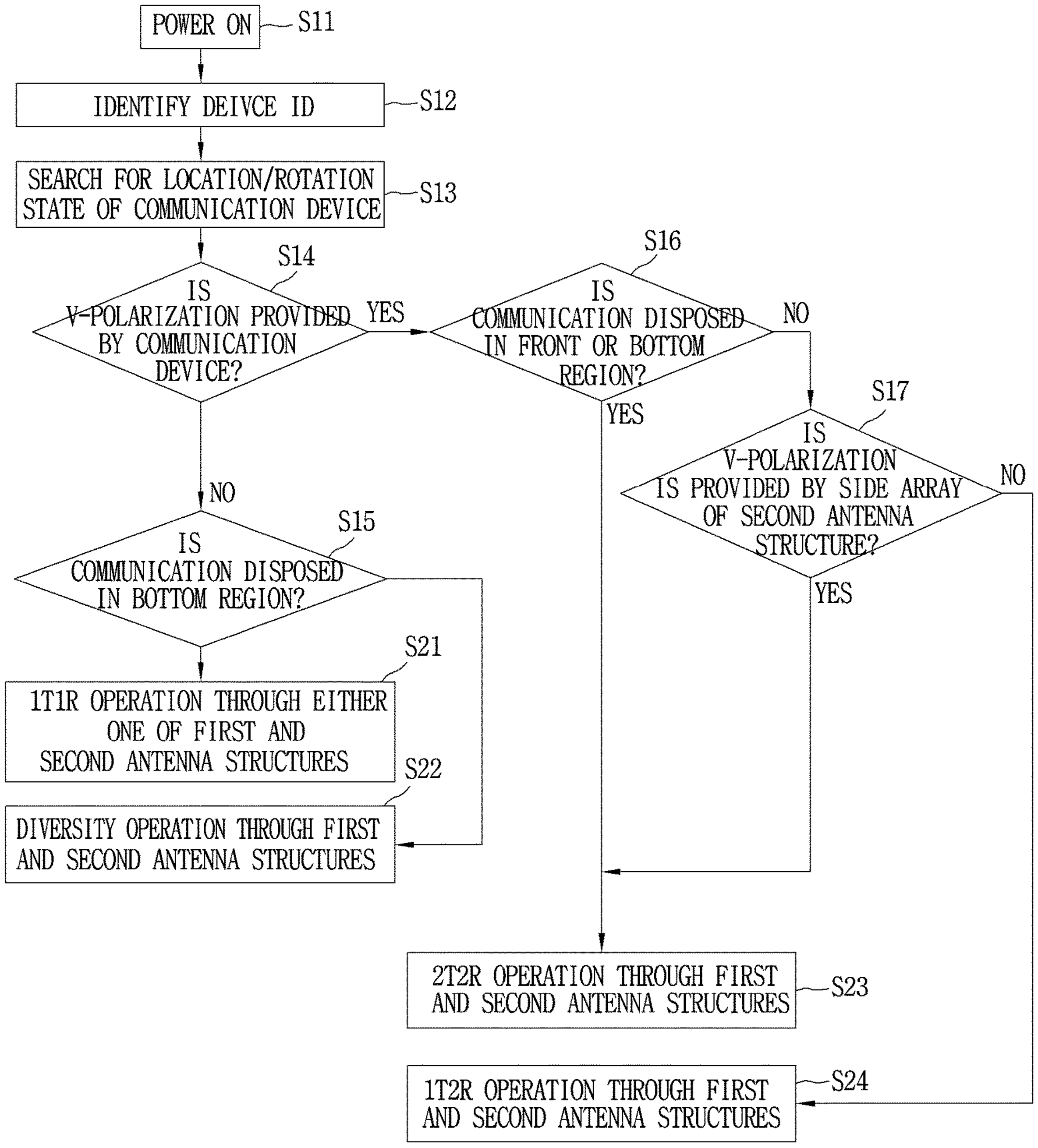
FIG. 14 is a flowchart showing an operation of a communication device and an electronic device that transmits and receives an A/V signal according to the present disclosure.

In this regard, FIG. 14 is a flowchart showing an operation of a communication device and an electronic device that transmits and receives an A/V signal according to the present disclosure. A method in which the electronic device 200 according to the present disclosure receives or transmits a wireless signal through a plurality of array antennas having first and second antenna structures will be described with referring to FIG. 14.

A method of changing or restoring an A/V signal transmission/reception beam according to the present disclosure will be described with reference to FIGS. 5 to 14. When the power of the communication device 100 and the electronic device 200 included in a wireless display system is turned on (S11), the electronic device 200 may identify a device ID of the communication device 100 (S12). The electronic device 200 may search for a location where the communication device 100 is placed and its rotation state (S13).

Based on the device ID, it may be determined whether the communication device 100 provides dual polarization (S14). It may be determined whether the antenna elements of the communication device 100 can transmit and receive a horizontally polarized signal and a vertically polarized signal.

The communication device 100 may be searched for in which region among a front region, a bottom region, one side region, and the other side region of the electronic device 200 is disposed. Accordingly, the electronic device 200 may determine whether the communication device 100 is disposed in a bottom region of the electronic device 200 (S15). When the communication device 100 provides dual polarization, it may be determined whether the communication device 100 is disposed in a front region or a bottom region of the electronic device 200 (S16).

When the communication device 100 provides single polarization, and the communication device 100 is disposed in a bottom region of the electronic device 200, a 1T1R operation may be performed through either one of the first and second antenna structures 1010*a*, 1010*b* (S21). Accordingly, a horizontally polarized signal may be transmitted and received through the second array antenna 1300*a* of the first antenna structure 1010*a*. Alternatively, a vertically polarized signal may be transmitted and received through the sixth array antenna 1300*d* of the second antenna structure 1010*b*. Accordingly, the communication device 100 and the electronic device 200 may perform the 1T1R operation through either one of the first and second antenna structures 1010*a*, 1010*b*.

When the communication device 100 provides single polarization, and the communication device 100 is disposed in a front region, one side region or the other side region of the electronic device 200, a diversity operation may be performed through the first and second antenna structures 1000*a*, 1000*b* (S22). Accordingly, a diversity operation of transmitting or receiving co-polarization signals may be performed through the first and second antenna structures 1000*a*, 1000*b*.

When the communication device 100 provides dual polarization, and the communication device 100 is disposed in a front region or a bottom region of the electronic device 200, both the first and second antenna structures 1000*a*, 1000*b* may be controlled to operate (S22).

When the seventh and eighth array antennas 1100*c*, 1100*d* provide vertical polarization, a 2T2R operation may be performed through the first and second antenna structures 1010*a*, 1010*b* (S23). Accordingly, a 2T2R operation may be performed as a multi-input multi-output (MIMO) operation that simultaneously transmits or receives a vertically polarized signal and a horizontally polarized signal.

When the seventh and eighth array antennas 1100*c*, 1100*d* do not provide vertical polarization, a 1T2R operation may be performed through the first and second antenna structures 1010*a*, 1010*b* (S24). Accordingly, the communication device 100 and the electronic device 200 may perform the 1T2R operation through either one of the first and second antenna structures 1010*a*, 1010*b*.

Meanwhile, the electronic device according to the present disclosure may appropriately select a plurality of array antennas of the first and second antenna structures based on a location of the communication device, and receive an A/V signal through optimal beamforming. In this regard, FIG. 15 is a flowchart of a method of selecting, changing, or restoring a radio beamforming signal through which an A/V signal is transmitted and received by an electronic device according to the present disclosure.

Figure 15:
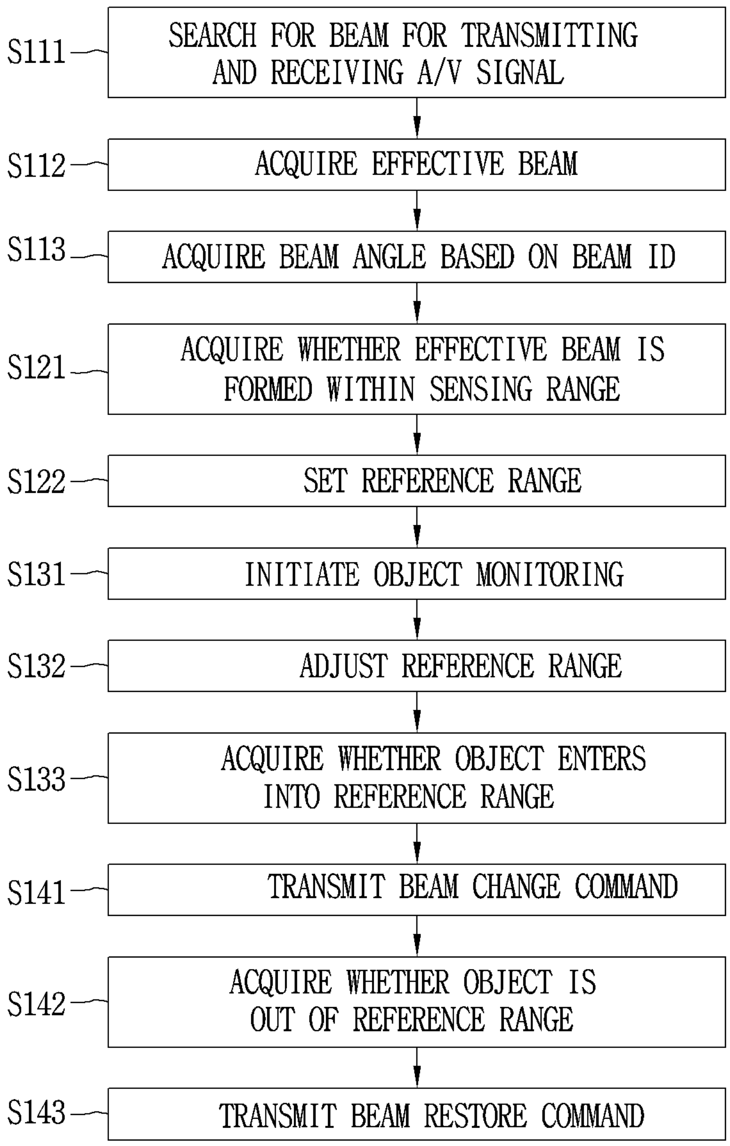
FIG. 15 is a flowchart of a method of selecting, changing, or restoring a radio beamforming signal through which an A/V signal is transmitted and received by an electronic device according to the present disclosure.

Subsequent to selecting/changing an operating mode of the plurality of array antennas in FIG. 14, a process of selecting, changing, or restoring a beam in FIG. 15 may be performed, but is not limited thereto. When a region in which a communication device is disposed is changed while performing wireless communication through the beam selection, change, or restoration process of FIG. 12, an operation mode of the array antenna of FIG. 11 may be changed.

A method of selecting, changing, or restoring, by an electronic device, a radio beamforming signal through which an A/V signal is transmitted/received will be described with reference to FIGS. 1, 2, and 5 to 14. The processor 290 may search for a beam that can be formed between the communication device 100 and the electronic device 200 (S111). The processor 290 may acquire all beams that can be formed between the communication device 100 and the electronic device 200 as a result of the search. Meanwhile, all beams may include a pair of beams composed of a transmission beam that transmits an A/V signal in the communication device 100 and a reception beam that receives an A/V signal from the electronic device 200.

In addition, the processor 290 may acquire an effective beam from among the beams 300 searched for that can be formed between the communication device 100 and the electronic device 200 (S112). The effective beam may be at least one beam selected for actually transmitting and receiving an A/V signal from among all beams searched for by the processor 290. Alternatively, the effective beam may be at least one beam that transmits and receives an A/V signal above a minimum transmission rate from among beams 300 that can be formed between the communication device 100 and the electronic device 200.

Furthermore, the processor 290 may acquire a beam angle based on a beam ID (S113). The beam ID may be an ID for identifying each of the beams 300 formed between the communication device 100 and the electronic device 200. The beam angle may include a beam reception angle, which is an angle at a side of the electronic device 200, and a beam transmission angle, which is an angle at a side of the communication device 100. The beam reception angle and the beam transmission angle may be angles measured with respect to an LOS path formed between the communication device 100 and the electronic device 200.

In addition, the processor 290 may acquire whether at least one effective beam is formed within a sensing range of a sensor (not shown) (S121). The sensor (not shown) may acquire at least part or both of the location and speed of an object.

In addition, the processor 290 may set a reference range when it is acquired that an effective beam is formed within a sensing range of a sensor (not shown) (S122). The reference range may be a range in which an A/V signal transmission/reception failure is expected to occur during object monitoring, which will be described later. The reference range may be a reference range for the processor 290 to transmit a beam change command or a beam restore command during object monitoring, which will be described later.

In addition, the processor 290 may initiate object monitoring (S131). Object monitoring may be an operation of monitoring at least part or both of the location and speed of an object located between the communication device 100 and the electronic device 200.

Meanwhile, the processor 290 may adjust the set reference range (S132). The processor 290 may or may not adjust the reference range according to the object. That is, step S132 may be an omissible step according to an embodiment. The processor 290 may adjust the reference range set in step S122. For example, the processor 290 may acquire a speed of an object and adjust a reference range based on the speed of the object.

The electronic device 200 according to an embodiment of the present disclosure may adjust a width of the reference range in real time in consideration of the speed of an object so as to maximize a time period during which an A/V signal is transmitted through a main beam having a fast transmission speed, thereby maximizing transmission efficiency as well as minimizing an A/V signal transmission/reception error. The processor 290 may acquire whether an object enters the reference range (S142).

When it is acquired that the object does not enter the reference range, the processor 290 may continuously acquire whether the object enters into the reference range without transmitting a beam change command.

Meanwhile, the processor 290 may transmit a beam change command to the communication device 100 when it is acquired that the object enters the reference range (S141). The beam change command may be a command for changing a beam for transmitting and receiving an A/V signal. According to the beam change command, any one of effective beams may be changed to a beam that transmits and receives an A/V signal. According to a beam change command, a beam selected as a beam that transmits and receives an A/V signal may be a sub-beam.

In this regard, when an object enters the reference range and wireless communication performance on a LOS path between the communication device 100 and the electronic device 200 deteriorates, a wireless link may be formed through another path. The electronic device 200 may form a wireless link to reflect a wireless signal transmitted from the communication device 100 through a ceiling or wall surface. To this end, the electronic device 200 may form a beamforming wireless signal in a ceiling direction (upper direction). The phase of a signal applied to the patch antennas PA21 to PA28 in a second row with respect to the patch antennas PA11 to PA18 in a first row of the first array antenna 1200*a* in a front direction may be adjusted to adjust the beamforming wireless signal to face an upper front direction.

Meanwhile, the processor 290 may acquire whether the object is out of the reference range (S142). The processor 290 may acquire whether the object is out of the reference range after the object enters the reference range and the beam is changed.

When it is acquired that the object is not out of the reference range, the processor 290 may continuously acquire whether the object is out of the reference range without transmitting a beam restore command. Meanwhile, the processor 290 may transmit a beam restore command to the communication device 100 when it is acquired that the object is out of the reference range (S143).

In the above, an electronic device having an antenna module has been described. The technical effects of the electronic device having the antenna module according to the present disclosure are as follows.

An electronic device according to the present embodiment may perform wireless communication of A/V data regardless of the location of an A/V transmitting device through first and second antenna structures in which a plurality of array antennas are disposed.

Furthermore, the A/V transmitting device may transmit two streams of data, thereby minimizing video quality deterioration that occurs when increasing a data compression rate.

In addition, since a horizontally polarized antenna and a vertically polarized antenna can be disposed together on one substrate, thereby allowing an antenna module to be compact and providing a high data reception rate.

Moreover, horizontally and vertically polarized signals may be used according to an array antenna disposition structure of the A/V transmitting device and the electronic device, thereby performing A/V wireless communication with reduced mutual interference while increasing a communication capacity.

Besides, horizontally and vertically polarized signals may be used in consideration of the location of the A/V transmitting device and electronic device the polarization characteristics of the array antennas, thereby performing A/V wireless communication with reduced mutual interference while increasing a communication capacity.

In addition, even when an obstacle is disposed on a wireless communication path between the A/V transmitting device and the electronic device, a beamforming direction may be changed and reflected waves may be used, thereby providing seamless A/V wireless communication.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

What is claimed is:

1. An electronic device comprising:

a display; and first and second antenna structures disposed around the display, wherein the first antenna structure comprises:

a first PCB comprising a multi-layer structure and comprising a first plurality of side surfaces, wherein:

a first surface of the first plurality of side surfaces faces a front direction of the electronic device, a second surface of the first plurality of side surfaces faces a rear direction of the electronic device, a third surface of the first plurality of side surfaces faces a left direction of the electronic device, a fourth side of the first plurality of side surfaces faces a right direction of the electronic device, and a fifth surface of the first plurality of side surfaces faces a bottom direction of the electronic device;

a first array antenna disposed on the first surface;

a second array antenna disposed on the fifth surface; and a first wireless communication IC disposed on the second surface, wherein the second antenna structure comprises:

a second PCB comprising a multi-layer structure and comprising a plurality of side surfaces, wherein:

a first surface of the plurality of side surfaces faces a front direction of the electronic device, a second surface of the plurality of side surfaces faces a rear direction of the electronic device, a third surface of the plurality of side surfaces faces a left direction of the electronic device, a fourth side of the plurality of side surfaces faces a right direction of the electronic device, and a fifth array antenna disposed on the first surface;

a sixth array antenna disposed on the fifth surface; and a second wireless communication IC disposed on the second surface, wherein a polarization of the first array antenna is the same as that of the fifth array antenna, and wherein a polarization of the second array antenna is different from that of the sixth array antenna, wherein the first array antenna is configured to radiate a polarized signal formed in a first polarization in a Y-axis direction to travel in an X-axis direction corresponding to the front direction, wherein the second array antenna is configured to radiate a polarized signal formed in the first polarization in the Y-axis direction to travel a lower Z-axis direction, wherein the fifth array antenna is configured to radiate a polarized signal formed in the first polarization in the Y-axis direction to travel in the X-axis direction corresponding to the front direction, wherein the sixth array antenna is configured to radiate a polarized signal formed in a second polarization in the X-axis direction to travel a lower Z-axis direction, wherein when a communication device that transmits and receives a wireless signal to and from the electronic device is located in a front direction of the electronic device, both the first array antenna and the fifth array antenna of the first polarization in a front direction of the first and second antenna structures are operated, and wherein when the communication device is located in a bottom region of the electronic device, either one of the second array antenna of the first polarization and the sixth array antenna of the second polarization located at lower surfaces of the first and second antenna structures and the second antenna structure are operated.

2. The electronic device of claim 1, wherein the communication device that transmits and receives a wireless signal to and from the electronic device configured to radiate a horizontally polarized signal, wherein when the communication device being located at one of a left or right side region of the electronic device, all array antennas located on a respective side surface of the first and second antenna structures corresponding to the left or right side region are operated, and wherein based on the communication device being located toward a bottom region of the electronic device, any one of array antennas located at lower surfaces of the first and second antenna structures are operated.

3. The electronic device of claim 1, wherein the first array antenna is a first patch antennas in 2×8 array, and the fifth array antenna is a second patch antennas in 2×8 array, wherein a feed location of each of the first and second patch antennas is biased to one side with respect to a central axis, wherein the second array antenna is a 1×10 array dipole antenna, and the sixth array antenna is a 1×10 array monopole antenna, and wherein polarization characteristics of the second array antenna and the sixth array antenna have a difference of 90 degrees.

4. The electronic device of claim 1, wherein the first antenna structure further comprises third and fourth array antennas which are monopole antennas in a 1×3 array on left and right sides of the first array antenna, respectively, wherein the second antenna structure further comprises seventh and eighth array antennas which are monopole antennas in a 1×3 array on left and right sides of the fifth array antenna, respectively, wherein the third and fourth array antennas radiate horizontally polarized signals, and wherein the seventh and eighth array antennas radiate horizontally polarized signals.

5. The electronic device of claim 1, wherein when a wireless link on a line-of-sight (LOS) path is able to be formed due to an obstacle between a communication device and the electronic device, a beam direction of the first or third array antenna is changed from a front direction to an upper front direction, wherein:

the first wireless communication IC adjusts a phase of a signal applied to antennas in a second row with respect to antennas in a first row of the first array antenna to control a beamforming wireless signal directed toward the upper front direction to reflect from a ceiling, and the second wireless communication IC adjusts a phase of a signal applied to antennas in a second row with respect to antennas in a first row of the second array antenna to control a beamforming wireless signal directed toward the upper front direction to reflect from the ceiling.

* * * * *